United States Patent [19]

Akagiri et al.

[11] Patent Number: 5,490,170

[45] Date of Patent: Feb. 6, 1996

[54] CODING APPARATUS FOR DIGITAL SIGNAL

[75] Inventors: Kenzo Akagiri; Kyoya Tsutsui, both of Kanagawa, Japan

[73] Assignee: Sony Corporation, Tokyo, Japan

[21] Appl. No.: 159,122

[22] Filed: Nov. 30, 1993

Related U.S. Application Data

[63] Continuation of Ser. No. 857,980, Mar. 26, 1992, abandoned.

[30] Foreign Application Priority Data

Mar. 29, 1991 [JP] Japan ..................... 3-091548
Mar. 30, 1991 [JP] Japan ..................... 3-092741

[51] Int. Cl.$^6$ ..................................... H04B 1/66
[52] U.S. Cl. ............................. 375/240; 381/30
[58] Field of Search ......................... 375/122, 25, 27, 375/240, 242, 244, 245; 381/29, 31, 30, 35, 36, 37; 348/384, 390, 398, 405; 395/2.13, 2.39; 364/725, 726

[56] References Cited

U.S. PATENT DOCUMENTS

| | | | |
|---|---|---|---|
| 4,455,649 | 6/1984 | Esteban et al. | 381/29 |
| 4,912,763 | 3/1990 | Galand et al. | 381/35 |
| 4,972,484 | 11/1990 | Theile et al. | |
| 5,109,417 | 4/1992 | Fielder et al. | 381/36 |
| 5,134,475 | 7/1992 | Johnston et al. | 358/133 |
| 5,151,941 | 9/1992 | Nishiguchi et al. | 381/36 X |
| 5,294,925 | 3/1994 | Akagiri | 381/37 X |
| 5,375,189 | 12/1994 | Tsutsui | 381/29 X |
| 5,381,143 | 1/1995 | Shimoyoshi et al. | 381/39 X |

FOREIGN PATENT DOCUMENTS

| | | |
|---|---|---|
| 0289080 | 4/1988 | European Pat. Off. . |
| 0409248 | 7/1990 | European Pat. Off. . |
| 0421259 | 9/1990 | European Pat. Off. . |
| 0428156 | 11/1990 | European Pat. Off. . |
| WO88/04117 | 6/1988 | WIPO . |

OTHER PUBLICATIONS

1990 International Conference on Acoustics, Speech and Signal Processing, Albuquerque, New Mexico, 3d–6th Apr. 1990), vol. 2, pp. 1093–1096, IEEE New York, A. Sugiyama et al. Adaptive transform coding with an adaptive block size (ATC–ABS).

Frequenz, vol. 43, No. 9, Sep. 1989, pp. 252–256, Berlin, DE: B. Edler: "Codierung von Audiosignalen mit überlappender Transformation und adaptiven Fensterfunktionen" (Paragraph 4: Stuerung der Fensteradaption.

*Primary Examiner*—Stephen Chin
*Assistant Examiner*—Tesfaldet Bocure
*Attorney, Agent, or Firm*—Limbach & Limbach; Ian Hardcastle

[57] ABSTRACT

In a coding apparatus for a digital signal adapted for implementing, every variable length block, floating processing to an input digital signal by using a block floating processing circuit thereafter to orthogonally transform signal components which have undergone such processing by using orthogonal transform circuits (e.g., DCT circuits), the block floating processing circuit is constructed so as to determine the length of a variable length block and a floating coefficient of the block floating processing on the basis of the same index, e.g., a maximum absolute value in that block. Thus, a quantity subject to processing can be reduced. In addition, there may be employed such a configuration to divide, every critical bands, spectrum signals on the frequency base from DCT (Discrete Cosine Transform) circuits to determine, every respective critical bands, allowed noises in which the masking is taken into consideration to compare these allowed noises and a minimum audible curve from a minimum audible curve generator at a comparator. When the minimum audible curve is grater than an allowed noise at that time, this minimum audible curve is considered as an allowed noise to divide the critical band into smaller bands to carry out bit allocation every respective smaller bands, and to rase or set a flag. Thus, an accurate allowed noise level can be provided without increasing auxiliary information.

68 Claims, 12 Drawing Sheets

5,490,170

CODING APPARATUS FOR DIGITAL SIGNAL

This is a continuation of application Ser. No. 07/857,980, filed on Mar. 26, 1992, now abandoned.

BACKGROUND OF THE INVENTION

1. Field of the Invention

This invention relates to an apparatus that applies block floating processing to a digital input signal, orthogonally transforms the block floating processed signal on the time axis into plural spectral coefficients on the frequency axis, divides the spectral coefficients into plural critical bands, and carries out adaptive bit allocation to quantize the spectral coefficients in each critical band.

2. Description of the Prior Art

As one of technologies for compressing a digital audio signal, and similar analog signals, it is known to apply block floating processing in which the digital input signal is divided into blocks of a predetermined number of words, and block floating processing is applied to each block. In known block floating processing, the maximum one of the absolute values of the words in the block is sought, and is used as a common block floating coefficient for all the words in the block.

Further, it is also known to use orthogonal transform coding to transform orthogonally a signal on the time axis into a signal on the frequency axis. The resulting spectral coefficients are then quantized. For example, it is known to divide, e.g., a PCM audio signal into blocks, each of a predetermined number of words, and to apply a Discrete Cosine Transform (DCT) to each block. In addition, it is also known to divide the spectral coefficients resulting from an orthogonal transform into critical bands and to quantize the spectral coefficients by applying adaptive bit allocation to each critical band. The number of bits allocated for quantizing the spectral coefficients in each critical band is determined depending on an allowable noise level in each critical band, which takes psycho-acoustic masking into consideration.

There are many instances where the operational processing for an orthogonal transform is executed by using a FIR (Finite-duration Impulse-Response) filter of the multi-tap type. This type of operational processing includes coefficient multiplication processing and/or operations for calculating a sum total, etc. The number of bits generated by such processing results the likelihood of overflows. To prevent such overflows, the number of bits generated by the operation must be allowed for in advance by, e.g., processing using several orders of bits greater than the number of bits in each word of the input signal. For such a multi-bit operation, a high performance DSP (Digital Signal Processing unit) is required, and it takes much time as well. Accordingly, simplification of the orthogonal transform processing is desirable.

In view of this, a technique has been proposed to apply the above-mentioned block floating processing to the digital input signal prior to the orthogonal transform processing. The block floating processing achieves bit compression of the input signal and reduces the number of bits subject to the orthogonal transform operation.

Further, a technique has been also proposed to adaptively vary the size of the block subject to the orthogonal transform processing depending on a signal. Such a technique is employed because, particularly when the input signal is divided into components in several (e.g., about three) frequency ranges, and the orthogonal transform processing is performed in each frequency range, varying the block length in response to the magnitude of temporal changes, or in response to a pattern, etc., in the frequency range signals permits a more efficient quantizing of the resulting spectral components than when the block length is fixed.

It is to be noted that when block floating is applied prior to the orthogonal transform processing, and the block length is adaptively changed depending on a signal, independent processing is applied, which results in the drawback that the amount of processing required is increased.

For example, as shown in FIG. 15, a relatively large block BL is divided in advance into several sub blocks (e.g., the four sub blocks $BL_{S1}$, $BL_{S2}$, $BL_{S3}$ and $BL_{S4}$). As indicated by step S31 of FIG. 16, the respective energies of the sub blocks $BL_{S1}$, $BL_{S2}$, $BL_{S3}$ and $BL_{S4}$ are calculated in the process of determining the size of the variable length block. At the next step S32, the block size is determined in response to the energies of the respective sub blocks. Then, at step S33, the maximum absolute value within the block determined in the previous step is calculated to implement block floating processing using the calculated maximum absolute value. At the next step S34, orthogonal transform processing, such as DCT, is applied to the block.

In such a processing procedure, calculation of the energy of each respective sub block $BL_{S1}$, $BL_{S2}$, $BL_{S3}$ and $BL_{S4}$ for determining the block size, and calculation of the maximum absolute values in the thus-determined blocks for applying the block floating processing are required. As a result, the quantity subject to processing or the number of steps in processing by a so-called microprogram is increased.

When determining an allowable noise level for each critical band to take account of masking, it has been proposed to correct the allowable noise level to take into consideration the minimum audible level characteristic of the human sense of hearing. In this, an allowable noise level already calculated is compared with a minimum audible level, and the greater level is selected as the new allowable noise level.

The allowable noise level in which masking is taken into consideration is assumed to be constant across each critical band. However, since the minimum audible level is measured using a sine wave, the can be an appreciable change in the minimum audible level between the low frequency end and the high frequency end of each critical band. This is particularly so at high frequencies, where the critical bands are relatively broad. For this reason, using a single minimum audible level for each critical band causes appreciable errors, resulting in the possibility of an excess number of bits being allocated for quantizing the spectral coefficients towards the high frequency end of the critical band.

In addition, although it is conceivable to divide the critical band into small sub bands, and to give a minimum audible level for each sub band, this is not preferable because the quantity of information required to be transmitted is increased.

SUMMARY OF THE INVENTION

This invention has been proposed, and its object is to provide an apparatus for compressing a digital input signal. Block floating is applied prior to the orthogonal transform processing and the length of the block subject to transform processing is changed depending on a signal. The apparatus is constructed so that the quantity subject to processing is reduced.

Another object of this invention is to provide an apparatus for compressing a digital input signal in which, when the input signal is divided in frequency into spectral coefficients in critical bands, and adaptive bit allocation is applied thereto on the basis of allowable noise levels, errors in the minimum audible level are reduced in those critical bands in which the minimum audible level is selected as the allowable noise level.

Accordingly, a first aspect of the invention provides an apparatus for compressing a digital input signal. The apparatus comprises an index generating circuit that generates an index in response to the digital input signal. Also included in the apparatus are a block length decision circuit, which determines a division of the digital input signal into blocks in response to the index, and a block floating processing circuit, which applies block floating processing to the blocks of the digital input signal in response to the index. The circuit further includes an orthogonal transform circuit that orthogonally transforms each block floating processed block of the digital input signal to produce plural spectral coefficients. Finally, the circuit comprises an adaptive bit allocation circuit that divides the plural spectral coefficients into bands, and adaptively allocates a number of quantizing bits to quantize the spectral coefficients in each of the bands.

A variation of the first aspect of the invention provides an apparatus for compressing a digital input signal. The apparatus comprises a band division filter that divides the digital input signal into a frequency range signal in each of plural frequency ranges. Also included in the apparatus are a block length decision circuit, which determines a division of each frequency range signal in time into blocks in response to an index, and a block floating processing circuit, which applies block floating processing to each frequency range signal in response to the index. The circuit also includes an orthogonal transform circuit that orthogonally transforms each block floating processed frequency range signal to produce plural spectral coefficients. The orthogonal transform circuit transforms each frequency range signal in blocks determined by the block length decision means. Finally, the apparatus comprises an adaptive bit allocation circuit that divides the plural spectral coefficients into bands, and adaptively allocates numbers of quantizing bits for quantizing the spectral coefficients in response to an allowable noise level in each of the bands.

A second aspect of the invention provides an apparatus for compressing a digital input signal. The apparatus comprises a circuit that derives plural spectral coefficients from the digital input signal, and an adaptive bit allocation circuit that divides the spectral coefficients by frequency into bands, and adaptively allocates a number of quantizing bits for quantizing the spectral coefficients in each band in response to an allowed noise level for each of the bands. The adaptive bit allocation circuit includes an allowable noise level calculation circuit that calculates an allowed noise level for each band, a comparator that compares the allowable noise level with a minimum audible level in each band, and a selector that selects the minimum audible level as the allowable noise level for each band in which the comparator determines that the minimum audible level is higher than the allowable noise level.

A variation on the second aspect of the invention provides an apparatus for compressing a digital input signal. The apparatus comprises a band division filter that divides the digital input signal into a frequency range signal in each of plural frequency ranges. Also included in the apparatus are a block floating processing circuit that applies block floating processing to each frequency range signal divided in time into blocks, and an orthogonal transform circuit that orthogonally transforming each block of each frequency range signal to provide plural spectral coefficients. Finally, the apparatus includes an adaptive bit allocation circuit that divides the spectral coefficients into bands, and adaptively allocates a number of quantizing bits for quantizing the spectral coefficients in each band in response to an allowable noise level in each band. The adaptive bit allocation circuit includes an allowable noise level calculation circuit that calculates the allowable noise level for each band, and a comparator for comparing the allowable noise level with a minimum audible level in each band, and that sets a flag for each band in which the minimum audible level is higher than the allowable noise level. Finally, the adaptive bit allocation circuit includes a selector that selects the minimum audible level as the allowed noise level in each band in which the flag is set.

When the allowable noise level in each critical band is determined by the minimum audible level, bit allocation is carried out according to the allowable noise level in plural sub bands obtained by further dividing the critical band in frequency. When this is done, a flag indicating that the minimum audible level has been adopted as the allowable noise level for the band only needs to be transmitted. This avoids the necessity of transmitting allowable noise level information for each sub band. Accordingly, accurate allowable noise levels can be provided without increasing the quantity of auxiliary information transmitted. This provides an improvement in signal quantity without degrading the signal compression efficiency. In addition, even if the absolute value of the minimum audible level is altered later, compatibility can be maintained.

A third aspect of the invention provides a method for compressing a digital input signal. In the method, an index is generated in response to the digital input signal, a division of the digital input signal into blocks is determined in response to the index, and block floating processing is applied to the blocks of the digital input signal in response to the index. Each block floating processed block of the digital input signal is orthogonally transformed to produce plural spectral coefficients, the spectral coefficients are divided into bands, and numbers of quantizing bits are adaptively allocated to quantize the spectral coefficients in each band.

A fourth aspect of the invention provides a method for compressing a digital input signal. In the method, plural spectral coefficients are derived from the digital input signal, the spectral coefficients are divided by frequency into bands, and a number of quantizing bits is allocated for quantizing the spectral coefficients in each band in response to an allowed noise level for each band. In the step of adaptively allocating a number of quantizing bits, an allowable noise level is calculated for each band, the allowable noise level is compared with a minimum audible level in each band, and the minimum audible level is selected as the allowable noise level in each band in which the minimum audible level is higher than the allowable noise level.

A fifth aspect of the invention provides an apparatus for expanding a compressed digital signal. The compressed digital signal includes plural quantized spectral coefficients and auxiliary information. The apparatus comprises adaptive bit allocation decoding circuit that operates in response to the auxiliary information and inversely quantizes the quantized spectral coefficients to provide plural spectral coefficients. The circuit also includes a block floating circuit that applies block floating to the spectral coefficients. Also included in the apparatus is an inverse orthogonal transform circuit means that inversely orthogonally transforms the block floating processed spectral coefficients to provide plural frequency range signals. Finally, the apparatus includes an inverse filter circuit that synthesizes the frequency range signals to provide an output signal.

A sixth aspect of the invention provides a method for expanding a compressed digital signal to provide a digital output signal. The compressed digital signal includes plural quantized spectral coefficients divided by frequency into bands. At least one of the bands is a divided band in which the spectral coefficients in the band are further divided by frequency into sub bands. The compressed digital signal additionally includes an allowed noise level for each band, and, for each divided band, a flag signal. The quantized spectral coefficients in each band and sub band are quantized using an adaptively-allocated number of quantizing bits. In the method, in each divided band, the allowed noise level of the band is set as the allowed noise level for the band when the flag signal for the band is in a first state. Also, in each divided band, the allowed noise level of the band is set as the allowed noise level for one of the sub bands constituting the band when the flag signal for the band is in a second state. Finally, in each divided band, an allowed noise level for each of the other sub bands constituting the band is calculated from the allowed noise level of the band. The allowable noise level for each band and sub band is then used to inversely quantize the respective quantized spectral coefficients in each band and sub band, and the digital output signal is derived from the resulting spectral coefficients.

DESCRIPTION OF THE PREFERRED EMBODIMENT

A preferred embodiment of this invention will now be described with reference to the attached drawings.

This invention can be applied to an apparatus for compressing a digital input signal, such as a PCM audio signal, etc., using subband coding (SBC), adaptive transform coding (ATC), and adaptive bit allocation (APC-AC). In the apparatus of the embodiment shown in FIG. 1, the digital input signal is divided into frequency range signals in plural frequency ranges. The bandwidths of the frequency ranges increase with increasing frequency. Orthogonal transform processing is applied to each frequency range signal to provide plural spectral coefficients. Adaptive bit allocation is used to quantize the spectral coefficients divided into critical bands in which the masking characteristic of the human sense of hearing is taken into consideration. In addition, in the embodiment of this invention, the block size is adaptively varied in response to a signal prior to the orthogonal transform processing, and block floating processing is applied to every block.

Figure 1:
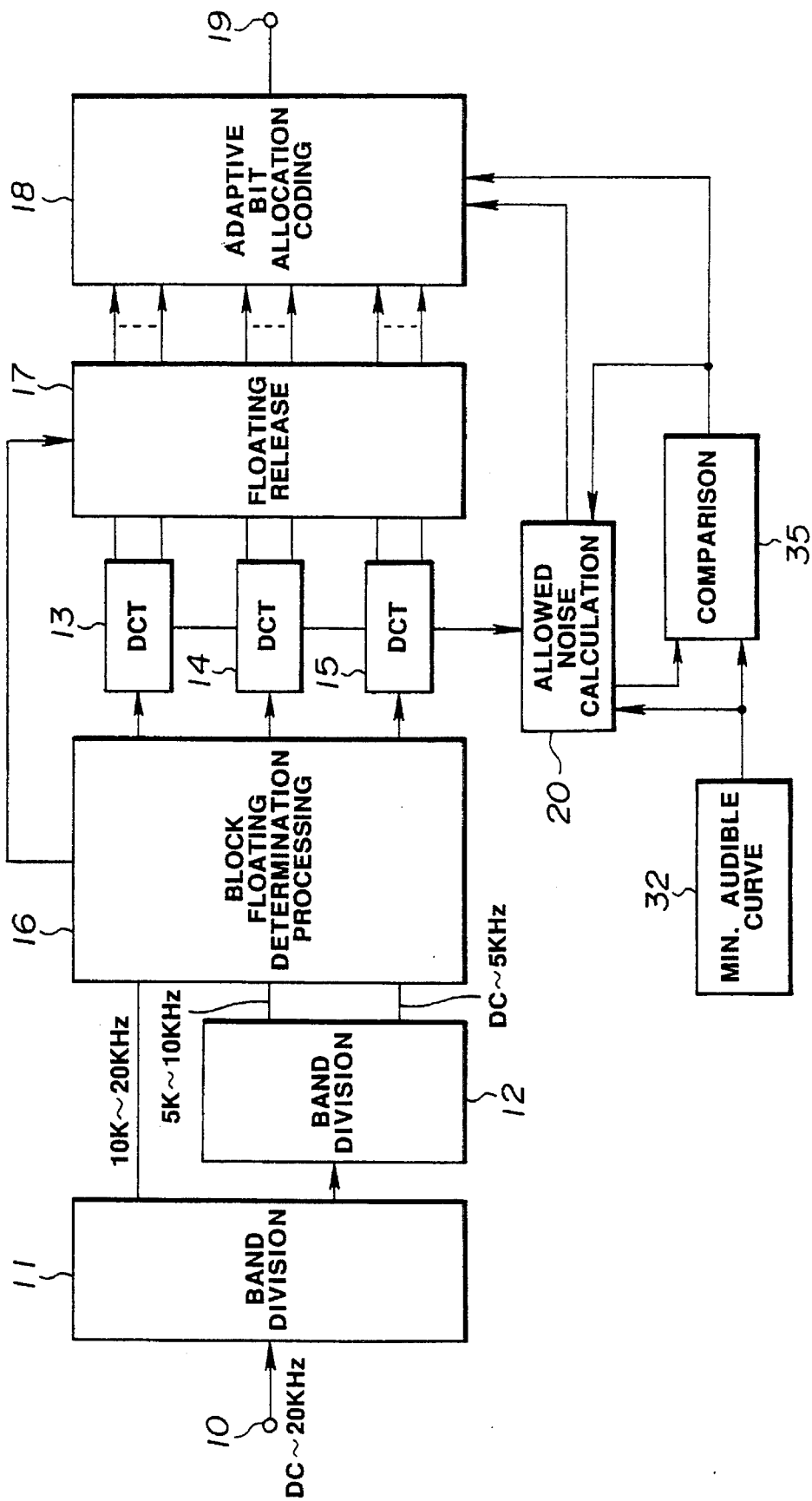
FIG. 1 is a circuit diagram showing, in a block form, the outline of the configuration of an apparatus for compressing a digital input signal according to an embodiment of this invention.

In FIG. 1, input terminal 10 is supplied with a PCM audio signal in the frequency range of, e.g., 0 Hz to 20 kHz. This input signal is divided into a signal in the frequency range of 0 Hz to 10 kHz and a frequency range signal in the frequency range of 10 to 20 kHz by using a band division filter 11, e.g., a Quadrature Mirror Filter (QMF filter), etc. The signal in the frequency range of 0 Hz to 10 kHz is further divided into a frequency range signal in the frequency range of 0 Hz to 5 kHz and a frequency range signal in the frequency range of 5 to 10 kHz by using a band division filter 12, e.g., a QMF filter, etc. The signal in the frequency range of 10 to 20 kHz from the band division filter 11 is sent to the Discrete Cosine Transform (DCT) circuit 13 serving as an orthogonal transform circuit, the signal in the frequency range of 5 to 10 kHz from the band division filter 12 is sent to the DCT circuit 14, and the signal in the frequency range of 0 Hz to 5 kHz from the band division filter 12 is sent to the DCT circuit 15. Thus, these signals are subjected to DCT processing, respectively.

In the embodiment of this invention, in order to reduce the quantity of operations in the orthogonal transform processing, block floating processing is applied to the frequency range signals prior to the orthogonal transform processing. This provides data compression. The block floating is released after the block floating processed signals have been orthogonally transformed.

Figure 15:
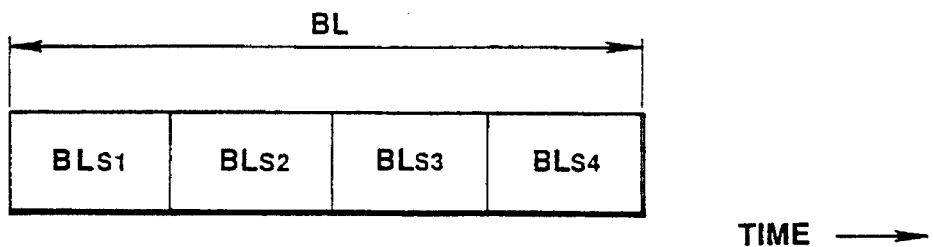
FIG. 15 is a view showing an example of the length of a block by the processing procedure in the prior art.
Figure 16:
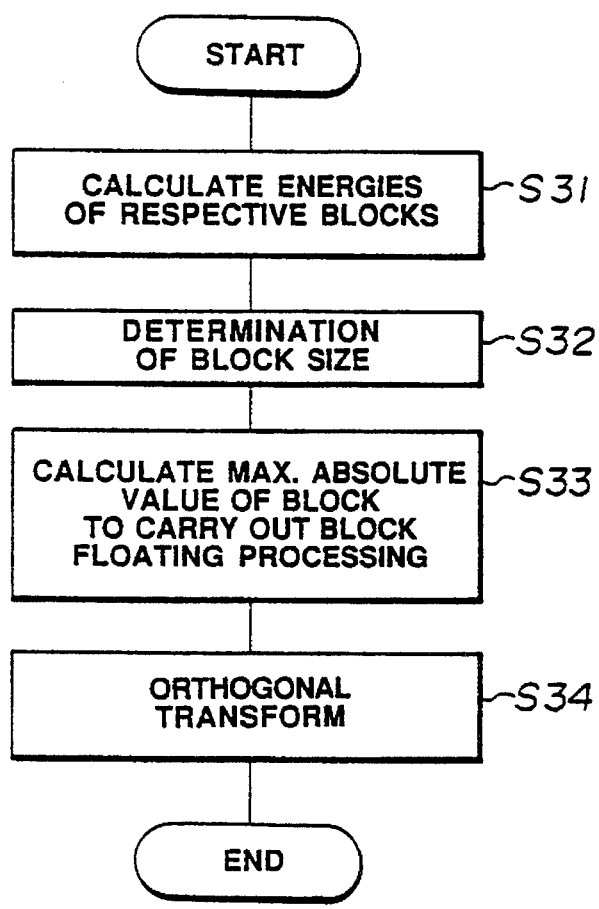
FIG. 16 is a flow chart showing an example of the procedure of a conventional block floating processing.

In FIG. 1, the frequency range signals obtained from the band division filters 11 and 12 are delivered to a block floating processing circuit 16, in which block floating processing is carried out using the respective blocks BL as shown in FIG. 15. In the transform circuits (DCT, i.e., Discrete Cosine Transform, circuits are shown in the example of FIG. 1) 13, 14 and 15, orthogonal transform processing is applied to the signals which have undergone such block floating processing. Thereafter, the block floating is released by the block floating release circuit 17. In releasing the block floating, block floating information from the block floating processing circuit 16 is used. Block floating coefficients may be determined in the block floating processing by taking the logical sum of the absolute values of the words in each block.

Figure 2:
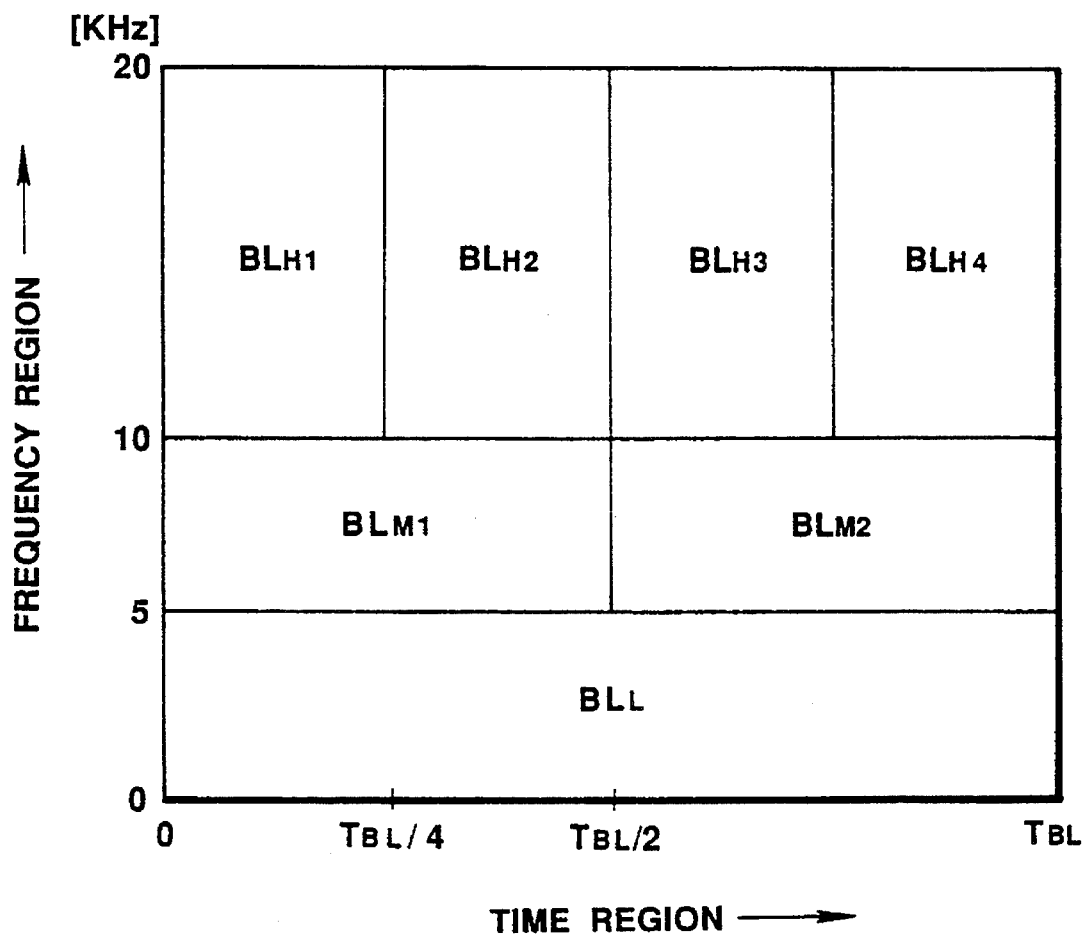
FIG. 2 is a view showing an actual example of how the input signal is divided into frequency ranges and how the input signal is divided in time into blocks in each frequency range in the embodiment.

FIG. 2 shows an actual example of how a frame of the digital input signal is divided into blocks in each frequency range prior to delivery to the DCT circuits 13, 14 and 15. In the actual example of FIG. 2, the bandwidth of the frequency ranges increases and the time resolution increases (i.e., the block size is reduced) as the frequency increases. For the frequency range signal in the low frequency range of 0 Hz to 5 kHz, one block BLL is chosen to have, e.g., 1024 samples. For the frequency range signal in the middle frequency range of 5 to 10 kHz, the frame is divided into two blocks $BL_{M1}$ and $BL_{M2}$, each having a length $T_{BL}/2$, one half of the length $T_{BL}$ of the block $BL_L$ in the low frequency range. For the frequency range signal in the high frequency range of 10 to 20 kHz, the signal is divided into four blocks $BL_{H1}$, $BL_{H2}$, $BL_{H3}$ and $BL_{H4}$, each having a length $T_{BL}/4$, one fourth of the length $T_{BL}$ of the block $BL_L$ of the low frequency range. It is to be noted that, in the case where the input signal has a frequency range of 0 Hz to 22 kHz, the low frequency range extends from 0 Hz to 5.5 kHz, the middle frequency range extends from 5.5 to 11 kHz, and the high frequency range extends from 11 to 22 kHz.

In the embodiment of this invention, as will be described later, the block size is caused to vary in response to a signal, and determination of the block size is carried out in response to the maximum absolute value used also for determining the block floating coefficients of the block floating.

Turning back to FIG. 1, the spectral coefficients obtained as the result of the DCT processing in the respective DCT circuits 13, 14 and 15, are subject to block floating release processing in the block floating release circuit 17, and are then divided by frequency into critical bands. The spectral coefficients are sent to the adaptive bit allocation circuit 18.

A critical band is division of the frequency range that takes into account characteristics of the human sense of hearing. A critical band is the band of noise that can be masked by a pure signal that has the same intensity as the noise and has a frequency in the middle of the critical band. The bandwidth of successive critical bands increases with increasing frequency. The audio frequency range of 0 Hz to 20 kHz is normally divided into, e.g., 25 critical bands.

The allowable noise calculation circuit 20 calculates an allowable noise level for each critical band, taking into account the masking effect. The spectral coefficients are divided into plural critical bands to calculate the number of bits to be allocated to quantize the spectral coefficients in each critical band. Quantizing bits are allocated on the basis of the allowable noise level and the energy or peak value, etc. in each critical band. In response to the bit numbers allocated to each critical band by the adaptive bit allocation circuit 18, the spectral coefficients are quantized. The quantized spectral coefficients are taken out through the output terminal 19.

The allowable noise calculation circuit 20 is supplied with a minimum audible level for each critical band from a minimum audible level curve generator 32. Each minimum audible level is compared with the allowable noise level, in which the masking effect is taken into consideration, in the comparator 35. As a result, when the minimum audible level is higher than the allowable noise level, the minimum audible level is selected as the allowable noise level.

According to the invention, some critical bands, especially the higher frequency critical bands, are divided into sub bands to take into consideration the error in the minimum audible level that occurs particularly in critical bands having a wide bandwidth. Dividing critical bands allows a minimum audible level for each sub band to be used for the respective allowable noise level for each sub band. Bit allocation is then carried out for each sub band.

The operation of the division into sub bands will now be described with reference to FIGS. 3 and 4.

Figure 3:
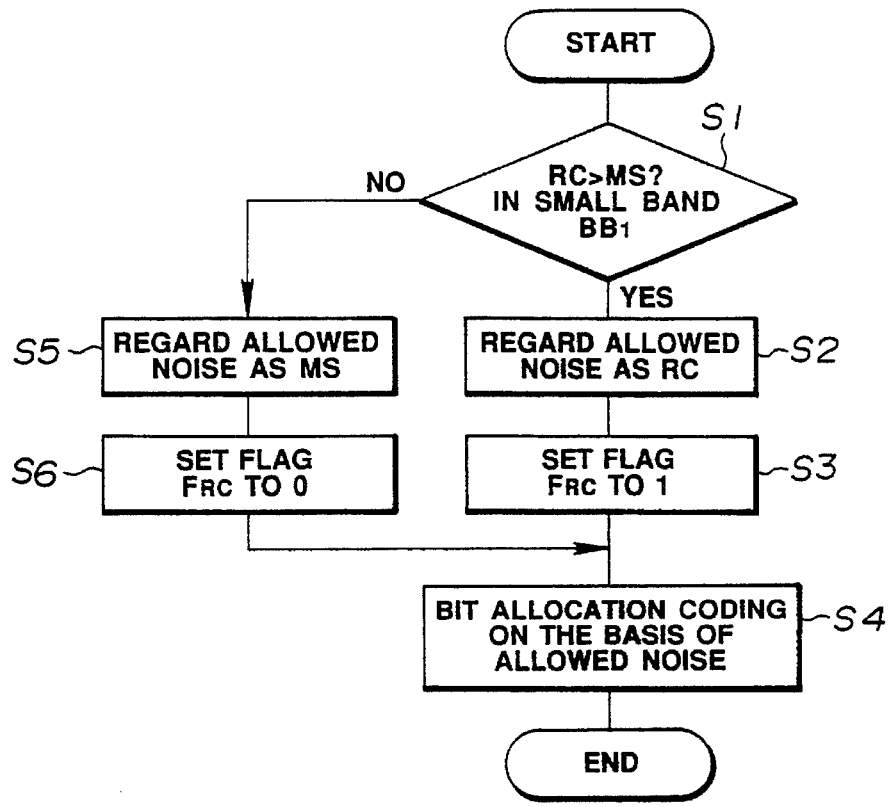
FIG. 3 is a flow chart for explaining the essential part of the process by which the allowable noise level is set in the embodiment.
Figure 4:
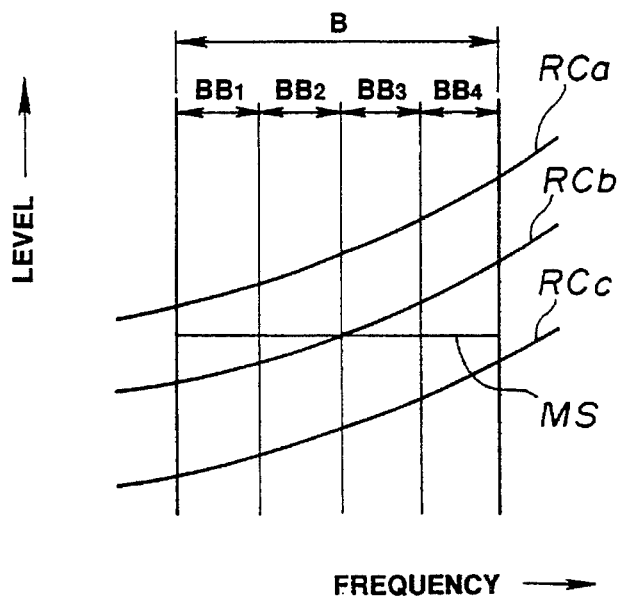
FIG. 4 is a view showing a critical band used for explaining how the allowable noise level is set in the embodiment.

FIG. 3 is a flow chart for explaining the operation, and FIG. 4 shows the example where one critical band B is divided into sub bands BB (four sub bands are shown in the example of FIG. 4).

In the step S1 of FIG. 3, it is determined whether or not the level of the minimum audible level curve RC of the sub band $BB_1$, the lowest frequency sub band of the four sub bands $BB_1$ to $BB_4$ of the critical band B, is higher than the masking level, which is the present allowable noise determined in consideration of masking (RC>MS). If the result of this step S1 is YES (the level of the minimum audible level curve RC is higher than the masking level MS), the operation proceeds to step S2 where the minimum audible level is selected as the allowable noise level. The flag $F_{RC}$ is set at the next step S3 ($F_{RC}=1$). The operation proceeds to step S4 where adaptive bit allocation is carried out using the level of the minimum audible level curve RC as the allowable noise level. Conversely, when the result of the step S1 is NO, the operation proceeds to step S5 where the masking level is selected as the allowable noise level. The flag $F_{RC}$ is cleared to 0 at step S6, and the process reverts to the step S4 where adaptive bit allocation is carried out.

Various possibilities for one critical band B are shown in FIG. 4. Where the minimum audible level curve is the curve RCa and the masking level is the level MS, the result of the step S1 is YES. Where the minimum audible level curve is the curve RCb or the curve RCc, the result of the step S1 is NO. When the minimum audible level curve is the curve RCa, the minimum audible level curve RCa is selected as the allowable noise level, and bit allocation is carried out in each sub band $BB_1$ to $BB_4$ in response to the allowable noise level in each sub band $BB_1$ to $BB_4$. On the other hand, when the minimum audible level curve is the curve RCb or the curve RCc, the masking level MS is selected as the allowable noise level, and bit allocation is carried out in response to a single allowable noise level throughout the whole critical band B.

The allowable noise level for each critical band is transmitted from the compressor as auxiliary information, along with quantized spectral coefficients as main information. This is so, even when the minimum audible level curve RCa is selected as the allowable noise level. The auxiliary information transmitted is a single allowable noise level for each critical band. The minimum audible level curve is determined from the characteristics of the human sense of hearing. Thus, a minimum audible level curve pattern, or relative value data, etc., can be stored in advance into a ROM, etc. The minimum audible level of the other sub bands $BB_2$ to $BB_4$ can easily be determined from the data in the ROM in response to the minimum audible level of, e.g., the lowest-frequency sub band $BB_1$.

Figure 5:
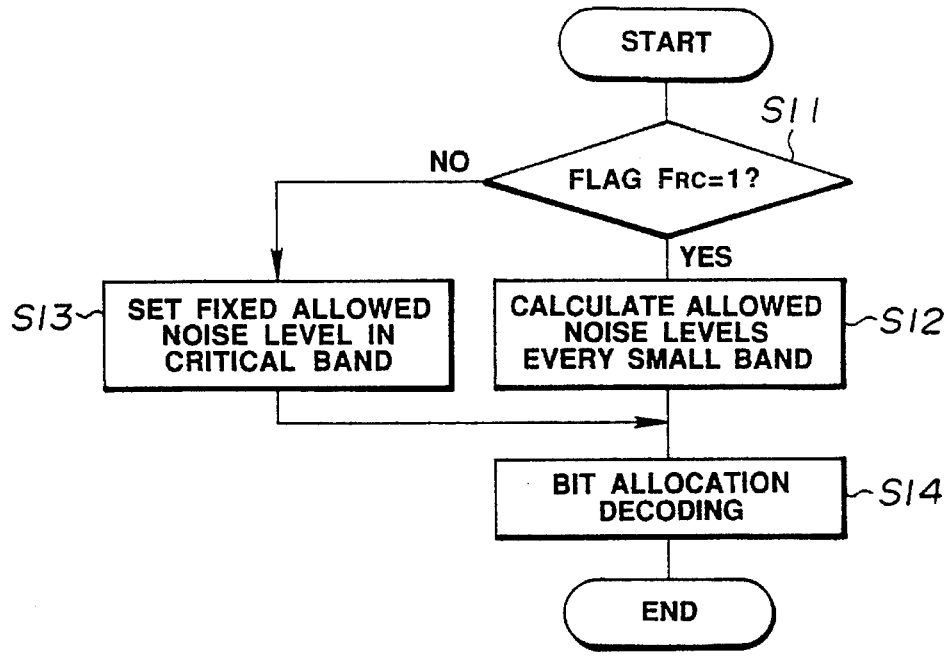
FIG. 5 is a flow chart for explaining the essential part of the decoding operation in the embodiment.
Figure 6:
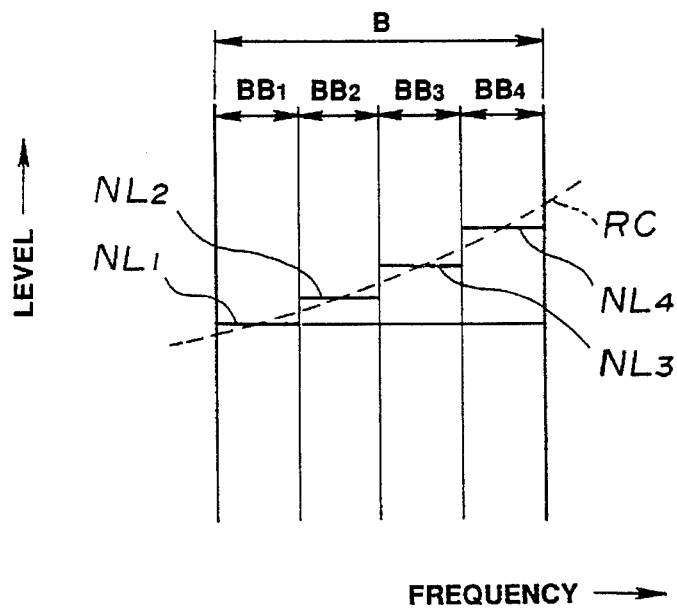
FIG. 6 is a view showing a critical band used for explaining the decoding operation in the embodiment.

FIG. 5 is a flow chart for explaining an essential part of the expansion processing in a complementary expander. At step S11 of FIG. 5, it is determined whether or not the flag $F_{RC}$ is 1. If the result is YES, i.e., the allowable noise level of the corresponding critical band is given by the minimum audible level curve, the allowable noise level for each sub band $BB_1$ to $BB_4$ is calculated at the next step S12. Even though only one allowable noise level is transmitted for all of the critical band B, e.g., the allowable noise level $NL_1$ of the lowest frequency sub band $BB_1$, as shown in FIG. 6, allowable noise levels $NL_2$ to $NL_4$ for the other sub bands $BB_2$ to $BB_4$ can be determined by calculation from the pattern of the minimum audible level curve RC by making use of a relative list, etc. of minimum audible level values stored in a ROM, etc. as described above.

If the result at the step S11 is NO, i.e., the allowable noise level for the critical band is given by the masking level MS, the operation proceeds to step S13 where a fixed allowable noise level is set for the whole of the critical band B. Bit allocation decoding processing takes place at step S14 in response to the allowable noise level determined at the respective one of the steps S12 and S13.

The method of determining the division of each frame of each frequency range signal into the blocks in which the respective frequency range signals are orthogonally transformed, and the way in which the block sizes are adaptively changed in response to a signal, i.e., each respective frequency range signal, will now be described.

Figure 7:
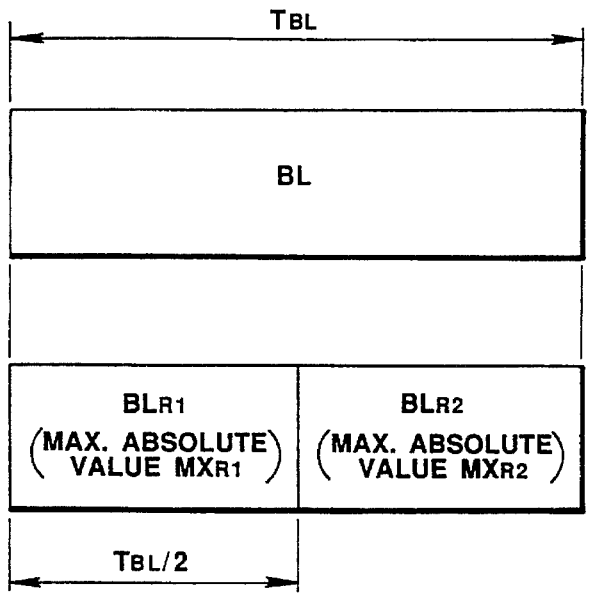
FIG. 7 is a view showing an example in which the block size in one frequency range is switched between two sizes in the apparatus of FIG. 1.

First, the case where the division of the frame is switched between a block BL, having a block length $T_{BL}$, and two blocks $BL_{R1}$ and $BL_{R2}$ each having a block length of $T_{BL}/2$, one half of $T_{BL}$, will be described with reference to FIG. 7. First, maximum absolute values (or logical sums) $MX_{R1}$ and $MX_{R2}$ in the respective sub blocks corresponding to the smaller blocks $BL_{R1}$ and $BL_{R2}$ are determined. Then, these maximum absolute values $MX_{R1}$ and $MX_{R2}$ are compared. When the ratio therebetween is as indicated by the following equation (1), the frame is divided into the smaller blocks $BL_{R1}$ and $BL_{R2}$.

$$MX_{R2}/MX_{R1} \geq 20 \qquad (1)$$

Otherwise, a block size equal to the size of the larger block BL is selected.

Figure 8:
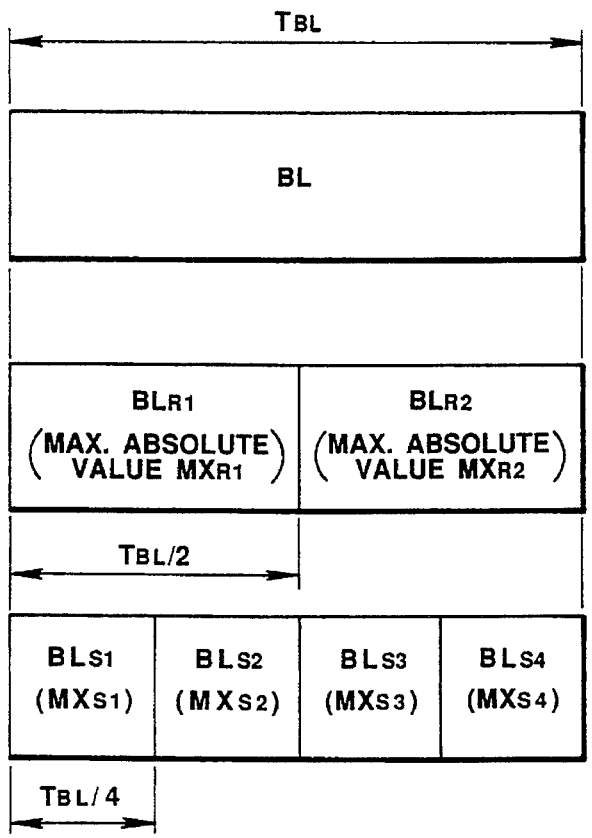
FIG. 8 is a view showing an example in which the block size in one frequency range is switched between three sizes in the apparatus of FIG. 1.

Next, the case where the division of the frame is switched between a large block BL having a block length $T_{BL}$, medium blocks $BL_{R1}$ and $BL_{R2}$ having a block length $T_{BL}/2$, one half of the block length $T_{BL}$, and small blocks $BL_{S1}$, $BL_{S2}$, $BL_{S3}$ and $BL_{S4}$, each having a block length $T_{BL}/4$, one fourth of the block length $T_{BL}$, will be described with reference to FIG. 8. First, respective maximum absolute values (or logical sums) $MX_{S1}$, $MX_{S2}$, $MX_{S3}$ and $MX_{S4}$ in the sub blocks corresponding to the small blocks $BL_{S1}$, $BL_{S2}$, $BL_{S3}$ and $BL_{S4}$ are determined. With respect to these four maximum absolute values $MX_{S1}$, $MX_{S2}$, $MX_{S3}$ and $MX_{S4}$, if the following relationship indicated by the following equation (2) holds, the frame is divided into blocks equal to the small blocks $BL_{S1}$, $BL_{S2}$, $BL_{S3}$ and $BL_{S4}$, having a length of $T_{BL}/4$.

$$MX_{Sn+1}/MX_{Sn} \geq 20 \qquad (2)$$

where n is 1, 2 or 3.

If the above equation (2) is not satisfied, the respective maximum absolute values (or logical sums) $MX_{R1}$ and $MX_{R2}$ in the sub blocks corresponding to the medium blocks $BL_{R1}$ and $BL_{R2}$ are determined. Then it is determined whether or not the following equation (3) is satisfied.

$$MX_{R2}/MX_{R1} \geq 10 \qquad (3)$$

If the above equation (3) is satisfied, the frame is divided into blocks equal to the medium blocks $BL_{R1}$ and $BL_{R2}$, having a length $T_{BL}/2$. Otherwise, i.e., the following equation (4) holds, and the frame remains undivided, with a block size of the large block BL having a length $T_{BL}$.

$$MX_{R2}/MX_{R1} < 10 \qquad (4)$$

Figure 9:
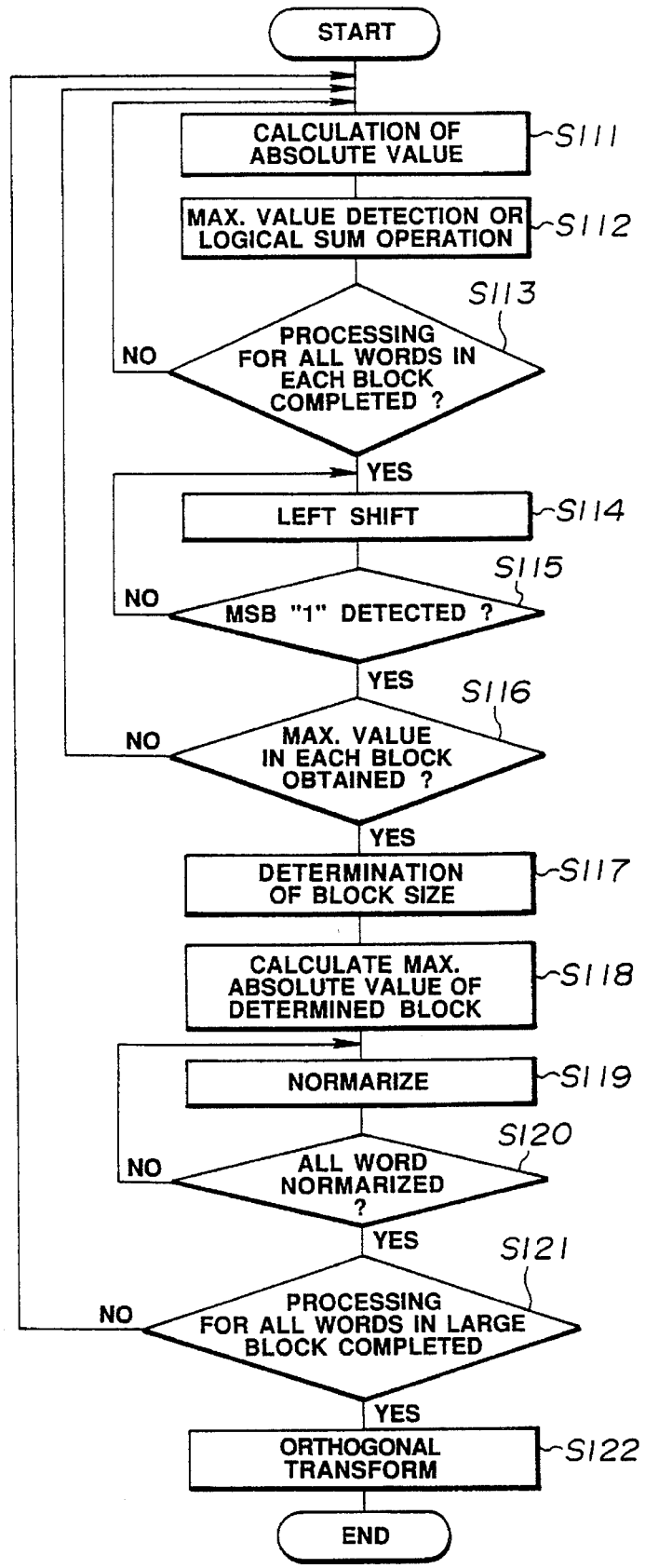
FIG. 9 is a flow chart for explaining the block floating operation of the embodiment.

FIG. 9 shows a software routine for processing each frequency range signal prior to orthogonal transform processing. Each frequency range signal comprises plural words. In FIG. 9, at step S111, the absolute value of each word is first calculated. At the next step S112, the maximum absolute value is detected. Instead of detecting the maximum absolute value, a logical sum operation may be performed. At the next step S113, it is determined whether the maximum absolute value of all the words in the sub block or whether the logical sum of all the words in the sub block has been taken. The sub block is an integral fraction of the frame, for instance one half (first example above) or one fourth (second example above) of the frame. When it is determined at the step S113 that the logical sum operation (or the absolute maximum value determination) of all the words is not completed (NO), the operation returns to the step S111. On the other hand, when the logical sum operation (or absolute maximum determination) of all the words is completed (YES), the operation proceeds to the next step S114.

At step S114, if the logical sum of the absolute values in the sub block is taken at step S112, processing to detect the maximum absolute value in the sub block is unnecessary. Floating coefficients (shift quantities) can be determined by simple processing including only a logical sum operation.

The steps S114 and S115 provide the operation for determining the shift quantity as the block floating coefficient. At the step S114, a left shift is carried out. At the step S115, it is determined whether the Most Significant Bit (MSB) of the shift result is equal to "1." If a "1" is not detected as the MSB at the step S115 (NO), the operation returns to the step S114. Otherwise, if a "1" is detected (YES), the operation proceeds to the next step S116.

At the step S116, it is determined whether the maximum absolute value (or shift quantity) of all sub blocks of the different sizes has been obtained. When the result is NO, the operation returns to the step S111. Otherwise, if the result is YES, the operation proceeds to the next step S117. At the step S117, the block size is determined using the above equation (1) or the above equations (2) to (4), and the maximum absolute value (or logical sum) of the block thus determined is calculated. At the next step S119, the words in the determined block are normalized (i.e., are subjected to floating processing). At step S120, it is determined whether all the words in the determined block have been normalized. If the result is NO, the operation returns to the step S119. Otherwise, if the result is YES, the operation proceeds to the next step S121. At the step S121, it is determined whether, when, e.g., the block size of the medium blocks $BL_{R1}$ and $BL_{R2}$ or the small blocks $BL_{S1}$, $BL_{S2}$, $BL_{S3}$ and $BL_{S4}$, is selected, the processing with respect to all blocks in the frame has been completed. If the result is NO, the operation returns to the step S111. Otherwise, if the result is YES, the operation proceeds to the next step S122. At the step S122, the orthogonal transform processing is carried out. The processing is thus completed.

In accordance with this embodiment, by using the maximum absolute value (or logical sum) calculated for each block to determine both the block floating coefficient and the block size, the quantity subject to processing can be reduced.

Thus, the number of steps, when, e.g., processing is carried out using a microprogram, can be reduced.

Figure 10:
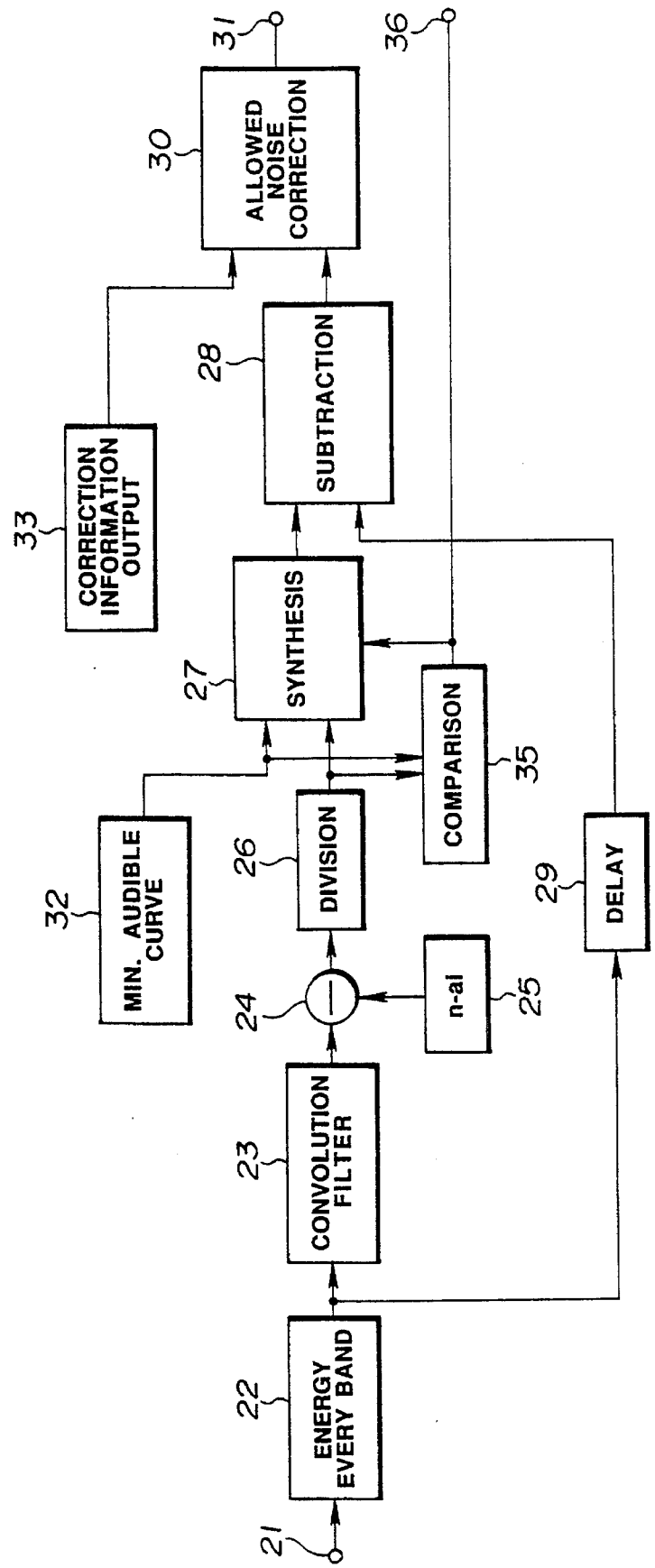
FIG. 10 is a circuit diagram showing, in a block form, an actual example of allowable noise calculation circuit 20 of the apparatus shown in FIG. 1.

FIG. 10 is a circuit diagram showing, in block form, the outline of the configuration of an actual example of the allowable noise calculation circuit 20. In FIG. 10, input terminal 21 is supplied with spectral coefficients from the respective DCT circuits 13, 14 and 15. An amplitude value and a phase value are calculated from the real number component and the imaginary number component of each spectral coefficient. This approach is employed in consideration of the fact that the human sense of hearing is considerably more sensitive in the frequency domain to amplitude than to phase.

Figure 11:
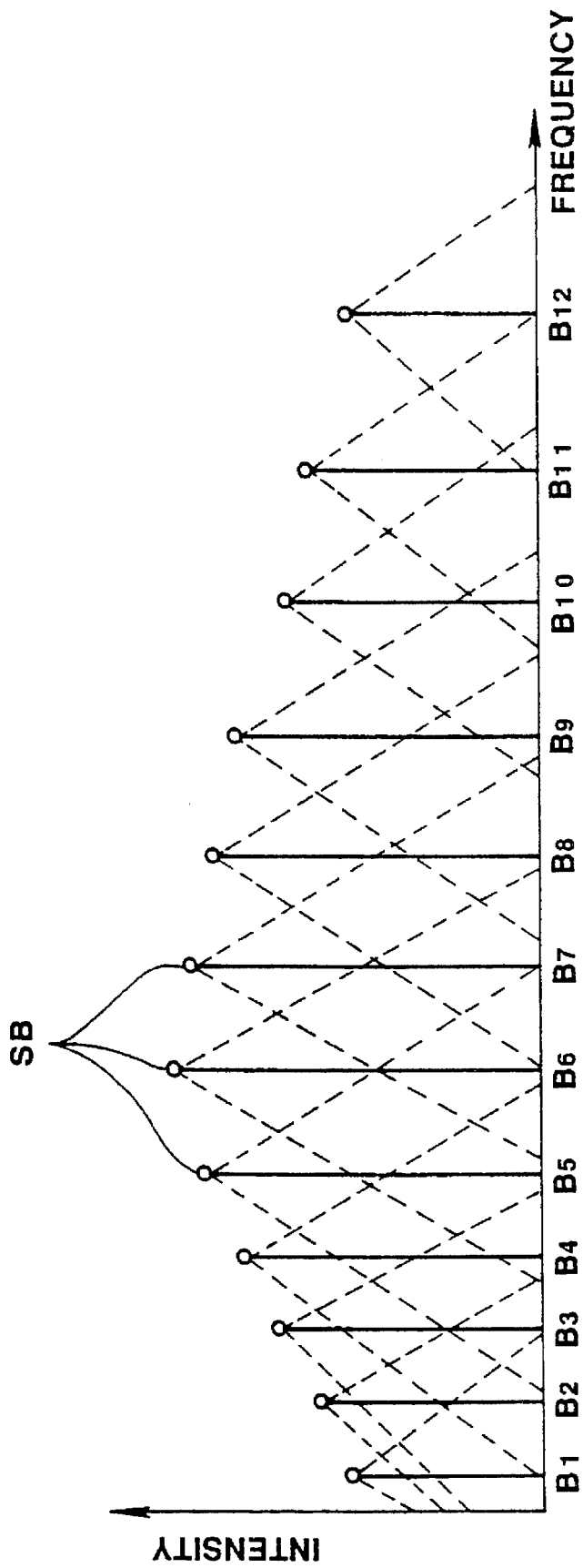
FIG. 11 is a view showing a bark spectrum.

The resulting amplitude values in the frequency domain are sent to the energy calculation circuit 22 in which an energy for each critical band is determined by, e.g., calculating the sum total of the respective amplitude values in the critical band, or any other appropriate method. Instead of determining the energy in each critical band, there are instances where a peak value, or a mean value of the amplitude values in the band may be used. The output from the energy calculation circuit 22, e.g., a spectrum of the energy sum in each respective critical band is generally called a bark spectrum. FIG. 11 shows such a bark spectrum SB for each critical band. To simplify the figure, only twelve bands ($B_1$ to $B_{12}$) are shown.

To allow for the influence of the masking of the bark spectrum SB, convolution processing is implemented to multiply the bark spectrum SB by predetermined filter coefficients and to add the multiplied results. To realize this, the output from the energy calculation circuit 22 in each critical band, i.e., respective values of the bark spectrum SB, is sent to the convolution filter circuit 23. This convolution filter circuit 23 comprises, e.g., plural delay elements for sequentially delaying input data, plural multipliers (e.g., 25 multipliers, one for each critical band) for multiplying the outputs from the delay elements by filter coefficients, and a sum total adder for summing the multiplier outputs. By this convolution processing, the sum total of the portion indicated by dotted lines in FIG. 11 is calculated.

Masking is a psychoacoustic phenomenon in which a signal is rendered inaudible if it is masked by another signal. There is temporal masking, in which a signal is masked by a signal occurring before or after it in time. There is also simultaneous masking, in which a signal is masked by a simultaneously-occurring signal of a different frequency. As a result of masking, if there is any noise in a portion of the spectrum subject to masking, such noise will be inaudible. For this reason, with an actual audio signal, any noise within the masking range of the signal is inaudible, and is regarded as allowable noise.

An actual example of the filter coefficients of the respective multipliers of the convolution filter circuit 23 will now be described. Assuming that the coefficient of a multiplier M corresponding to an arbitrary band is 1, the multiplying operation is carried out as follows: at the multipliers M−1, M−2, M−3, M+1, M+2, and M+3, the outputs from the respective delay elements are multiplied by the filter coefficients of 0.15, 0.0019, 0.0000086, 0.4, 0.06, and 0.007, respectively. Thus, convolution processing of the bark spectrum SB is carried out. M is an arbitrary integer of 1 to 25.

The output of the convolution filter circuit 23 is sent to a subtractor 24. The subtractor 24 determines the level $\alpha$ corresponding to the allowable noise level in the convoluted region. The level $\alpha$ is the level that gives an allowable noise level for each critical band by deconvolution as will be described below. An allowed function (i.e., a function representing the masking level) for determining the level $\alpha$ is delivered to the subtractor 24. By increasing or decreasing this allowed function, control of the level $\alpha$ is carried out. The allowed function is delivered from the (n−ai) function generator 25, which will be described later.

The level of $\alpha$ corresponding to the allowable noise level is determined by the following equation:

$$\alpha = S - (n - ai) \quad (5)$$

where i is the number of the critical band, 1 being the number of the lowest frequency critical band, n and a are constants, a is greater than 0, S is the intensity of the convolution processed bark spectrum, and (n−ai) is the allowed function. In this embodiment, n is set to 38 and a is set to 1. This provides satisfactory results with no degradation of sound quality.

In this way, the level $\alpha$ is determined, and is transmitted to the divider 26, which applies deconvolution to the level $\alpha$ in the convoluted region. Accordingly, by carrying out this deconvolution, a masking spectrum is provided from the level $\alpha$. This masking spectrum becomes the primary allowable noise spectrum. It is to be noted that, while normally deconvolution processing requires a complicated operation, a simple divider 26 is used in this embodiment to carry out deconvolution.

Figure 12:
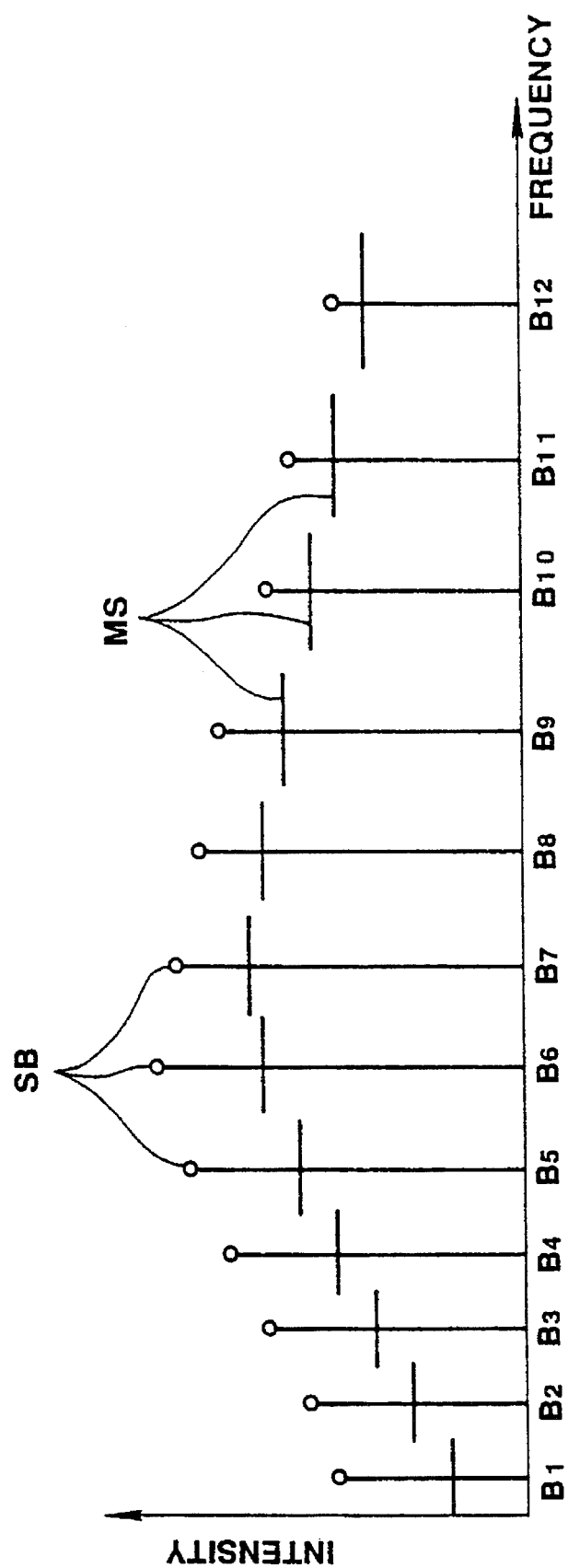
FIG. 12 is a view showing a masking spectrum.

Then, the masking spectrum is transmitted to the subtractor 28 through the synthesis circuit 27. Here, the subtractor 28 is supplied with the output of the energy calculating circuit 22 for each critical band, i.e., the previously-described bark spectrum SB, through the delay circuit 29. Accordingly, at the subtractor 28, a subtraction operation between the masking spectrum and the bark spectrum SB is carried out. Thus, as shown in FIG. 12, the portion of the bark spectrum SB having a level lower than the level of the masking spectrum MS is subjected to masking.

The output from the subtractor 28 is taken out through the allowable noise corrector 30 and the output terminal 31, and is sent to a ROM, etc. (not shown) in which, e.g., allocated bit number information are stored. The ROM, etc. provides quantizing bit number information for each critical band in response to the output obtained through the allowable noise corrector 30 from the subtractor 28 (i.e., in response to the level difference between energy in each critical band and the output of the allowable noise calculating circuit). The quantizing bit number information is sent to the adaptive bit allocation circuit 18, (FIG. 1) where the spectral coefficients from the DCT circuits 13, 14 and 15 are quantized using numbers of bits allocated to each critical band.

The adaptive bit allocation circuit 18 quantizes the spectral coefficients in each band using the number of bits allocated in response to the difference in energy between respective critical bands and the output of the allowable noise calculating circuit. The delay circuit 29 is provided to delay the bark spectrum SB from the energy calculation circuit 22 to take account of delays in the circuits preceding the synthesis circuit 27.

Figure 13:
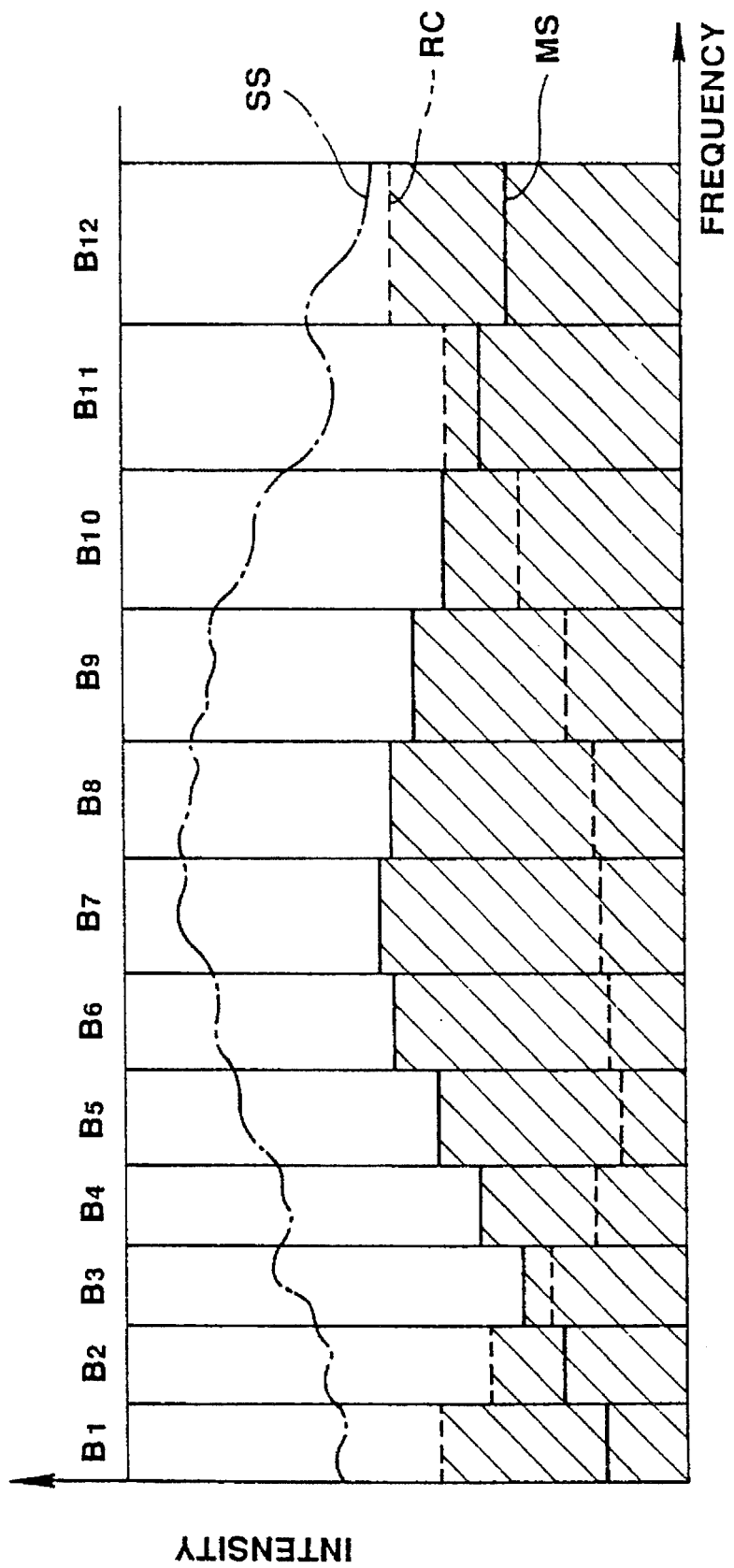
FIG. 13 is a view in which a minimum audible level curve and a masking spectrum are synthesized.

The synthesis circuit 27 synthesizes the minimum audible level curve RC and the masking spectrum MS. The minimum audible level curve is a characteristic of the human sense of hearing, as shown in FIG. 13, and is delivered from the minimum audible level curve generator 32. According to the minimum audible level curve, noise having an absolute level below the minimum audible level curve cannot be heard. Even with the same coding, the minimum audible level curve depends on the volume at the time of reproduction. However, since there is not a great variation in the manner in which a music is represented by, e.g., the 16-bit dynamic range in actual digital systems, if it is assumed that the quantizing noise in the frequency band in which the ear is most sensitive, i.e., in the vicinity of 4 kHz, quantizing noise less than the level of the minimum audible level curve can be regarded as being inaudible in other frequency bands. Therefore, if it is assumed that the system is used such that the quantizing noise near 4 kHz, for a certain quantizing word length, is inaudible, and that the allowable noise level is obtained by synthesizing the minimum audible level curve RC and the masking spectrum MS, then the allowable noise level in each critical band will be the greater of the level of the minimum audible level curve and the masking level. This is shown by the hatched lines in FIG. 13. In the present embodiment, the level of the minimum audible level curve at 4 kHz is matched to the minimum level corresponding to, e.g., quantizing using 20 bits. FIG. 13 also shows the signal spectrum SS.

As explained above with reference to FIGS. 3 to 6, in the critical bands where the minimum audible level is selected as the allowable noise level, quantizing bit allocation is performed by dividing the critical band into sub bands. The minimum audible level curve from the minimum audible level curve generator 32 and the masking spectrum MS from the divider 28 are compared with each other in the comparator 35. The result is sent to the synthesis circuit 27. The flag $F_{RC}$ is taken from output terminal 36. For example, in the bands $B_{11}$ and $B_{12}$ of FIG. 13, since the level of the minimum audible level curve RC is higher than the level of the masking spectrum MS, the minimum audible level curve level RC is selected as the allowable noise level, and the flag $F_{RC}$ is set to 1. Thus, the level of the minimum audible level curve RC for the lowest frequency of the sub bands into which the critical band is divided will be transmitted. As described above, calculation of allowable noise levels for the other sub bands is carried out in the expander.

The allowable noise level corrector 30 corrects the allowable noise level at the output of the subtractor 28 in response to information regarding, e.g., the equal loudness curve from the correction information output circuit 33. The equal loudness curve is a curve characterizing another characteristic of the human sense of hearing. The equal loudness curve corrects sound pressure levels at different frequencies so that they are perceived as sounding as loud as a pure sound at 1 kHz. The equal loudness curve has substantially the same characteristic as the minimum audible level curve RC shown in FIG. 13.

According to the equal loudness curve, a sound in the vicinity of 4 kHz is perceived as being as loud as a sound at 1 kHz having a sound pressure level 8 to 10 dB higher. On the other hand, a sound in the vicinity of 50 Hz must have a sound pressure level some 15 dB higher than a sound at 1 kHz sound to be perceived as sounding as loud. Because of this, the allowable noise level must be corrected using the equal loudness curve to adjust the allowable noise level for the loudness sensitivity of the human sense of hearing.

Additionally, the correction information output circuit 33 may also correct the allowable noise level in response to the difference between the actual number of bits used by the adaptive bit allocation circuit 18 (FIG. 1) to quantize the spectral coefficients, and the target number of bits, which is the total number of bits available for quantizing. The reason why such a correction is made is as follows. There are instances in which there is an error occurs between the total number of bits allocated by the primary bit allocation process and the target number of bits, which is determined by the bit rate of the compressed digital signal. In such instances, the quantizing bit allocation is made for a second time to reduce the error to zero. For example, if the total number of bits allocated is less than the target value, a number of bits equal to the difference between the actual number of bits and the target number of bits is allocated among the critical bands to provide additional bits. Alternatively, if the actual number of bits is more than the target number of bits, a number of bits corresponding to the difference between the actual number of bits and the target number of bits is removed from the critical bands to remove excess bits.

To correct the actual number of bits, the difference between the actual number of bits and the target number of bits is measured and the output correction information output circuit 33 provides correction data that is used to correct the numbers of bits allocated to the critical bands. Where the error data indicates that insufficient bits have been allocated, an increased number of bits are used per critical band. Conversely, where the error data indicates that excess bits have been allocated, fewer bits can be used in each critical band. The correction information output circuit 33 provides data for the correction value for correcting the allowable noise level at the output from the subtractor 28, e.g., on the basis of information data of the equal loudness curve, in response to the error data. The correction value is transmitted to the allowable noise level correction circuit 30. Thus, the allowable noise level from the subtractor 28 is corrected.

The above-described synthesis processing for the minimum audible level curve may be omitted. In this case, minimum audible level curve generator 32 and synthesis circuit 27 are unnecessary, and the output from the subtractor 24 is subjected to deconvolution at the divider 26, and is transmitted immediately to the subtractor 28.

Block floating processing and block floating release processing may also be applied in the expander, before and after, respectively, the inverse orthogonal transform (IDCT) processing. In the expander, the logical sum of the absolute values of the spectral coefficients for each block may be taken to determine the block floating coefficient for the block.

Figure 14:
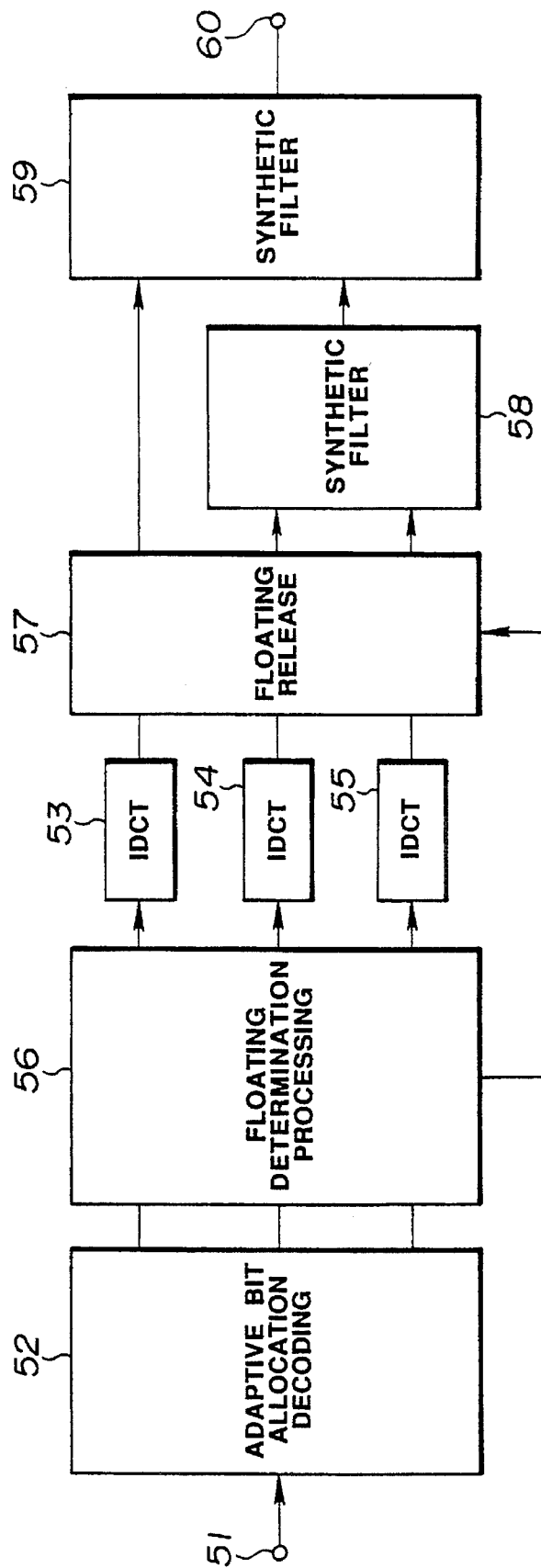
FIG. 14 is a block diagram showing an actual example of a decoder to which the embodiment of this invention can be applied.

In FIG. 14, the input terminal 51 is supplied with quantized spectral coefficients obtained from the output terminal 19 of the compressor shown in FIG. 1. The quantized spectral coefficients is sent to the adaptive bit allocation decoder 52, where the adaptive bit allocation applied by the adaptive bit allocation circuit in the compressor is reversed. The resulting spectral coefficients are sent to the block floating processing circuit 56, where block floating processing is applied to each block of spectral coefficients in each frequency range. Then, the blocks of block floating processed spectral coefficients are subject to inverse orthogonal transform (IDCT, i.e. Inverse Discrete Cosine Transform circuits 53, 54 and 55 in the example of FIG. 14) processing, inverse to the othogonal transform processing applied by the respective orthogonal transform circuits 13, 14 and 15 of FIG. 1. The outputs from the inverse orthogonal transform circuits 53, 54 and 55 are sent to the block floating release circuit 57, where block floating release processing is applied to each block using the block floating information from the block floating processing circuit 56. The resulting frequency range signals in the respective frequency ranges from the block floating release circuit 57 undergo, by using the synthesis filters 58 and 59, processing opposite to the processing by the band division filters 11 and 12 of FIG. 1, so that the respective frequency range signals are synthesized to provide a single digital output signal. The digital output signal thus synthesized is taken out from the output terminal 60.

It is to be noted that this invention is not limited to the above-described embodiment, but is applicable, e.g., not only to a signal processing apparatus for an audio signal but also to a signal processing apparatus for a digital speech signal or a digital video signal, etc.

As described above, the apparatus for a compressing a digital input signal according to this invention is adapted to carry out block floating processing of the digital input signal in variable length blocks, and thereafter to implement orthogonal transform processing thereto. In the compressor, by determining the size of each block and the block floating coefficient of the block floating processing in response to the same index, it is possible to reduce a quantity subject to processing, or the number of steps of a program.

Further, in accordance with the apparatus for compressing a digital input signal, when the allowable noise level for each critical band is determined using the minimum audible level, bit allocation is carried out according to the allowable noise level in sub bands obtained by further dividing a critical band, and only a flag indicating this is transmitted. This avoids the necessity of sending an allowable noise level for each sub band. Accordingly, accurate allowable noise levels can be provided without increasing the quantity of auxiliary information transmitted. This way, signal quantity can be improved without degrading the data compression efficiency. In addition, even if the absolute value of the minimum audible level is altered later, compatibility can be maintained.

What is claimed is:

1. An apparatus for compressing a digital input signal, the apparatus comprising:
    band division filter means for dividing the digital input signal in frequency into plural signals, each of the plural signals being in a respective one of plural frequency ranges, the plural signals including a frequency range signal in one of the plural frequency ranges;
    block length decision means, operating in response to an index, for determining a division of the frequency range signal into blocks to provide a block length decision signal indicating a block length for each of the blocks;
    block floating processing means, operating in response to the block length decision signal from the block length decision means and in response to the index, for applying block floating processing to the blocks of the frequency range signal, each of the blocks having the block length indicated by the block length decision signal, the block floating processing circuit providing a block of a block floating processed frequency range signal from each of the blocks of the frequency range signal;
    orthogonal transform means for orthogonally transforming the block of the block floating processed frequency range signal to produce plural spectral coefficients; and
    adaptive bit allocation means for dividing the plural spectral coefficients from the orthogonal transform means into bands and for adaptively allocating a number of quantizing bits to quantize the spectral coefficients in each of the bands in response to an allowable noise level in each of the bands.

2. The apparatus of claim 1, wherein:
    the frequency range signal includes plural words, each of the words having an absolute value; and
    the apparatus additionally includes generating means for generating the index by calculating a logical sum of the absolute values of the words.

3. The apparatus of claims 1 or 2, wherein the orthogonal transform means includes a Discrete Cosine Transform circuit.

4. The apparatus of claim 1, wherein:
    (a) the apparatus additionally comprises:
        means for subdividing the frequency range signal into sub blocks, and
        index generating means for generating an index for each of the sub blocks obtained by subdividing the frequency range signal;
    (b) the block length decision means determines the division of the frequency range signal into blocks by comparing the indices of consecutive ones of the sub blocks of the frequency range signal to determine a number of the consecutive ones of the sub blocks to constitute each of the blocks; and
    (c) the block floating processing means applies block floating processing to the blocks of the frequency range signal having the block length indicated by the block length decision signal using, for each one of the blocks, a block floating coefficient calculated from the indices of the sub blocks constituting the one of the blocks.

5. The apparatus of claim 4, wherein:
    the frequency range signal includes plural words, each of the words having an absolute value; and
    the index calculating means calculates the index for each one of the sub blocks by determining a maximum absolute value for the one of the sub blocks.

6. The apparatus of claim 4, wherein
    the block length decision means includes:
        (1) a comparing means for comparing the indices of the consecutive ones of the sub blocks to provide a comparison result, and
        (2) a block defining means, responsive to the comparison result provided by the comparing means, for determining a division of the frequency range signal into blocks constituted a selected one of:
            (i) one of the adjacent sub blocks;
            (ii) two of the adjacent sub blocks; and
            (iii) four of the adjacent sub blocks.

7. The apparatus of claim 6, wherein:
    the means for subdividing the frequency range signal into sub blocks is additionally for subdividing the frequency range signal into frames, the frames including a frame constituted of a first sub block and a second sub block;
    the comparing means is for comparing the indices of the first sub block and the second sub block to provide the comparison result; and
    the block defining means determines a division of the frequency range signal wherein the frame of the frequency range signal constituted of the first sub block and the second sub block is divided into two equal blocks when the comparison result provided by the comparing means indicates that the index of the second sub block is twenty or more times the index of the first sub block, and otherwise determines a division of the frequency range signal wherein the frame is divided into a single block.

8. The apparatus of claim 6, wherein:
    the means for subdividing the frequency range signal into sub blocks subdivides the frequency range signal into half sub blocks and into quarter sub blocks, and is additionally for subdividing the frequency range signal into frames, the frames including a frame constituted of a first half sub block and a second half sub block, the frame is also constituted of four quarter sub blocks, the four quarter sub blocks including pairs of consecutive ones of the quarter sub blocks, each of the pairs consisting of a first quarter sub block and a second quarter sub block;

the comparing means is for comparing the indices of the first half sub block and the second half sub block to provide a first comparison result, and is additionally for comparing the indices of the first quarter sub block and the second quarter sub block in each of the pairs of consecutive ones of the quarter sub blocks to provide a second comparison result; and the block defining means determines a division of the frequency range signal wherein the frame of the frequency range signal is divided into:

four equal blocks when the second comparison result from the comparing means indicates that the index of the second quarter sub block of any one of the pairs of the consecutive ones of the quarter sub blocks is twenty or more times greater than the index of the first quarter sub block of the one of the pairs of the consecutive ones of the quarter sub blocks, two equal blocks when the first comparison result from the comparing means indicates that the index of the second half sub block is ten or more times, but less than twenty times, the index of the first half sub block, and a single block when the first comparison result from the comparing means indicates that the index of the second half sub block less than ten times the index of the first half sub block.

9. An apparatus for compressing a digital input signal, the apparatus comprising:

band division filter means for dividing the digital input signal into plural signals, each of the plural signals being in a respective one of plural frequency ranges, the plural signals including a frequency range signal in one of the plural frequency ranges;

block floating processing means for applying block floating processing to blocks of the frequency range signal to provide a block floating processed frequency range signal;

orthogonal transform means for orthogonally transforming blocks of the block floating processed frequency range signal to provide plural spectral coefficients; and adaptive bit allocation means for dividing the spectral coefficients from the orthogonal transform means into bands and for adaptively allocating a number of quantizing bits for quantizing the spectral coefficients in each of the bands in response to an allowable noise level in each of the bands, the adaptive bit allocation means including:

allowable noise level calculation means for calculating the allowable noise level for each of the bands, comparison means for comparing, in each of the bands, the allowable noise level with a minimum audible level and, for each of the bands in which the minimum audible level is higher than the allowable noise level, for setting a flag, and means for selecting, in each of the bands in which the flag is set, the minimum audible level as the allowable noise level.

10. The apparatus of claim 9, wherein:

the adaptive bit allocation means quantizes the spectral coefficients using an actual number of quantizing bits;

the apparatus additionally includes:

means for providing an output signal including a target number of bits, and means for determining an error between the actual number of bits and the target number of bits; and the allowable noise level calculation means calculates the allowable noise level from an energy in each of the bands, and includes means for adjusting the allowable noise level in response to the error between the actual number of bits and the target number of bits.

11. The apparatus of claim 10, wherein the adaptive bit allocation means additionally includes means for adjusting the number of quantizing bits allocated to each of the bands by changing the allowable noise level.

12. The apparatus of claim 9, wherein:

the apparatus additionally comprises a block length decision means, operating in response to an index, for determining a division of the frequency range signal into the blocks;

the block floating processing means applies block floating processing to the blocks of the frequency range signal using the index as a block floating coefficient; and the orthogonal transform means transforms the block floating processed frequency range signal divided into blocks determined by the block length decision means.

13. The apparatus of claims 9, 10, 11, or 12, wherein the orthogonal transform means includes a Discrete Cosine Transform (DCT) circuit.

14. The apparatus of claim 9, wherein:

the adaptive bit allocation means is additionally for dividing the spectral coefficients in one of the bands from the orthogonal transform means into plural sub bands, the plural sub bands including a lowest-frequency sub band; and the comparison means is for comparing, in the one of the bands, the allowable noise level for the one of the bands with the minimum audible level for the lowest-frequency sub band, and for setting the flag for the one of the bands when the minimum audible level for the lowest-frequency sub band is higher than the allowable noise level.

15. An apparatus for compressing a digital input signal, the apparatus comprising:

index generating means for generating an index in response to the digital input signal;

block length decision means for determining a division of the digital input signal into blocks in response to the index;

block floating processing means for applying block floating processing to the blocks of the digital input signal in response to the index to provide block floating processed blocks of the digital input signal;

orthogonal transform means for orthogonally transforming each of the block floating processed blocks of the digital input signal to produce plural spectral coefficients; and adaptive bit allocation means for dividing the plural spectral coefficients from the orthogonal transform means into bands, and for adaptively allocating a number of quantizing bits to quantize the spectral coefficients in each of the bands.

16. The apparatus of claim 15, wherein:

the digital input signal comprises plural words, each of the plural words having an absolute value; and the index generating means generates the index by calculating a logical sum of the absolute values of the words.

17. The apparatus of claims 15 or 16, wherein the orthogonal transform means includes a Discrete Cosine Transform circuit.

18. The apparatus of claim 15, wherein:
   (a) the index generating means generates an index for each of plural sub blocks obtained by dividing the digital input signal;
   (b) the block length decision means includes comparing means for comparing the indices of consecutive ones of the sub blocks of the digital input signal to determine a number of the consecutive ones of the sub blocks of the digital input signal to constitute each one of the blocks; and
   (c) the block floating processing means applies block floating processing to the blocks of the digital input signal determined by the block length decision means using, for each one of the blocks, a block floating coefficient calculated from the indices of the sub blocks constituting the one of the blocks.

19. The apparatus of claim 18, wherein:
   the digital input signal includes plural words, each of the words having an absolute value; and
   the index calculating means calculates the index for each one of the sub blocks by determining a maximum of the absolute values of the words in the one of the sub blocks.

20. The apparatus of claim 18, wherein:
   (a) the index generating means includes:
      (1) means for dividing the digital input signal into the sub blocks, and
      (2) index calculating means for calculating an index for each of the sub blocks; and
   (b) the block length decision means additionally includes block defining means, responsive to the comparing means, for determining a division of the digital input signal into blocks constituted of a selected one of:
      (i) one of the sub blocks,
      (ii) two consecutive ones of the sub blocks, and
      (iii) four consecutive ones of the sub blocks.

21. The apparatus of claim 20, wherein:
   the means for dividing the digital input signal into the sub blocks includes:
      means for dividing the digital input signal into frames, and
      means for dividing each of the frames into a first sub block and a second sub block;
   the comparing means is for comparing the indices of the first sub block and the second sub block to provide a comparison result; and
   the block defining means determines a division of the digital input signal into blocks in which the frames of the digital input signal for which the comparison result indicates that the index of the second sub block is twenty or more times the index of the first sub block are divided into two equal blocks, and otherwise determines a division of the digital input signal into blocks in which the frames are each divided into a single block.

22. The apparatus of claim 20, wherein:
   (a) the means for dividing the digital input signal into sub blocks includes:
      (1) means for dividing the digital input signal into flames, and
      (2) means for dividing each of the flames into a first half sub block, a second half sub block, and into four quarter sub blocks, the four quarter sub blocks including pairs of consecutive ones of the quarter sub blocks, each of the pairs consisting of a first quarter sub block and a second quarter sub block;
   (b) the comparing means is for comparing the indices of the first half sub block and the second half sub block to provide a first comparison result, and for comparing the indices of pairs of the first quarter sub block and the second quarter sub block in each of the pairs of consecutive ones of the quarter sub blocks to provide a second comparison result; and
   (c) the block defining means determines a division of the digital input signal into blocks in which:
      (1) ones of the flames for which the second comparison result indicates that the index of the second quarter sub block of any one of the pairs of consecutive ones of the quarter sub blocks is twenty or more times greater than the index of the first of the one of the pairs of the consecutive ones of the quarter sub blocks are divided into four equal blocks,
      (2) ones of the flames for which the first comparison result indicates that the index of the second half sub block is ten or more times, but less than twenty times, the index of the first half sub block is divided into two equal blocks, and
      (3) ones of the flames for which the first comparison result indicates that the index of the second half sub block is less than ten times the index of the first half sub block are divided into a single block.

23. The apparatus of claim 15, wherein the adaptive bit allocation means is for dividing the spectral coefficients into bands corresponding to critical bands.

24. The apparatus of claim 15, wherein the adaptive bit allocation means is for dividing the spectral coefficients towards higher frequencies into bands corresponding to a fraction of a critical band.

25. An apparatus for compressing a digital input signal, the apparatus comprising:
   block length decision means for determining a division of the digital input signal into blocks in response to an index;
   block floating means for applying block floating processing to each of the blocks of the digital input signal using the index as a block floating coefficient; and
   means for deriving spectral coefficients from the block floating processed blocks of the digital input signal; and
   adaptive bit allocation means for dividing the spectral coefficients by frequency into bands and for adaptively allocating a number of quantizing bits for quantizing the spectral coefficients in each of the bands in response to an allowable noise level for each of the bands, the adaptive bit allocation means including:
   allowable noise level calculation means for calculating an allowable noise level for each of the bands,
   comparing means for comparing, in each of the bands, the allowable noise level with a minimum audible level, and
   selecting means for selecting the minimum audible level as the allowable noise level in each of the bands for which the comparing means determines that the minimum audible level is higher than the allowable noise level.

26. The apparatus of claim 25, wherein the means for deriving spectral coefficients from the digital input signal includes an orthogonal transform circuit.

27. The apparatus of claim 26, wherein the orthogonal transform circuit is a Discrete Cosine Transform (DCT) circuit.

28. The apparatus of claims 25 or 26, wherein:
the bands into which the adaptive bit allocation means divides the spectral coefficients include a band corresponding to a critical band;
the adaptive bit allocation means is additionally for dividing the spectral coefficients in the band corresponding to a critical band into sub bands, the sub bands including a lowest-frequency sub band;
the comparing means is for comparing, in the band corresponding to a critical band, the allowable noise level for the band corresponding to a critical band with the minimum audible level for the lowest-frequency sub band; and
the selecting means is for selecting, as the allowable noise level for the sub bands in the band corresponding to a critical band, the respective minimum audible levels for the sub bands when the comparing means indicates that the minimum audible level for the lowest-frequency sub band is higher than the allowable noise level.

29. The apparatus of claims 25 or 26, wherein:
the number of quantizing bits adaptively allocated by the adaptive bit allocation means is an actual number of bits;
the apparatus additionally includes:
means for providing an output signal including a target number of bits, and
means for determining an error between the actual number of bits and the target number of bits; and
the allowable noise level calculation means includes means for adjusting the allowable noise level in ones of the bands in response to the error between the actual number of bits and the target number of bits.

30. The apparatus of claim 29, wherein the adaptive bit allocation means adjusts the number of quantizing bits allocated to the bands in response to changes in the allowable noise level in the ones of the bands caused by the means for adjusting the allowable noise level.

31. A method for compressing a digital input signal, the method comprising the steps of:
generating an index in response to the digital input signal;
determining a division of the digital input signal into blocks in response to the index;
applying block floating processing to the blocks of the digital input signal in response to the index to provide block floating processed blocks of the digital input signal;
orthogonally transforming each of the block floating processed blocks of the digital input signal to produce plural spectral coefficients; and
dividing the plural spectral coefficients into bands, and adaptively allocating a number of quantizing bits to quantize the spectral coefficients in each of the bands.

32. The method of claim 31, wherein:
the digital input signal comprises plural words, each of the plural words having an absolute value; and
in the step of generating an index, the index is generated by calculating a logical sum of the absolute values of the words.

33. The method of claims 31 or 32, wherein, in the step of orthogonally transforming each of the block floating processed blocks of the digital input signal, each of the block floating processed blocks of the digital input signal is orthogonally transformed using a discrete cosine transform.

34. The method of claim 31, wherein:
(a) in the step of generating an index, an index is generated for each of plural sub blocks obtained by dividing the digital input signal;
(b) the step of determining a division of the digital input signal into blocks includes a step of comparing the indices of consecutive sub blocks of the digital input signal to determine a number of the consecutive sub blocks of the digital input signal to constitute each one of the blocks; and
(c) in the step of applying block floating processing to the blocks of the digital input signal, block floating processing is applied to the blocks of the digital input signal using, for each one of the blocks, a block floating coefficient calculated from the indices of the sub blocks constituting the one of the blocks.

35. The method of claim 34, wherein:
the digital input signal includes plural words, each word having an absolute value; and
in the step of generating an index, the index for each one of the sub blocks is calculated by determining a maximum of the absolute values of the words in the one of the sub blocks.

36. The method of claim 34, wherein:
(a) the step of generating an index includes steps of:
(1) dividing the digital input signal into sub blocks, and
(2) calculating an index for each of the sub blocks; and
(b) in the step of determining a division of the digital input signal into blocks, a division of the digital input signal into blocks constituted of a selected one of one sub block, two sub blocks, and four sub blocks is determined in response to the step of comparing the indices of consecutive sub blocks.

37. The method of claim 36, wherein:
(a) the step of dividing the digital input signal into sub blocks includes steps of:
(1) dividing the digital input signal into frames, and
(2) dividing each frame into a first sub block and a second sub block;
(b) in the step of the comparing the indices of consecutive sub blocks, the indices of the first sub block and the second sub block are compared; and
(c) in the step of determining a division of the digital input signal into blocks, a division of each frame of the digital input signal into two equal blocks is determined when the step of comparing determines that the index of the second sub block is twenty or more times the index of the first sub block, and a division of the frame of the digital input signal into a single block is otherwise determined.

38. The method of claim 36, wherein:
(a) the step of dividing the digital input signal into sub blocks includes steps of:
(1) dividing the digital input signal into frames, and
(2) dividing each frame into a first half sub block, a second half sub block, and into our quarter sub blocks;
(b) in the step of comparing the indices of consecutive sub blocks, the indices of the first half sub block and the second half sub block are compared, and the indices of pairs of consecutive quarter sub blocks are compared, each pair of consecutive quarter sub blocks including a first quarter sub block and a second quarter sub block; and
(c) in the step of determining a division of the digital input signal into blocks, the division of each frame of the digital input signal is determined as follows:
(1) into four equal blocks when the step of comparing indicates that the index of the second of any pair of consecutive quarter sub blocks is twenty or more times greater than the index of the first of any pair of consecutive quarter sub blocks, (2) into two equal blocks when the step of comparing indicates that the index of the second half sub block is ten or more times, but less than twenty times, the index of the first half sub block, and (3) into a single block when the step of comparing indicates that the index of the second half sub block less than ten times the index of the first half sub block.

39. The method of claim 31, wherein, in the step of dividing the plural spectral coefficients into bands, the spectral coefficients are divided into bands corresponding to critical bands.

40. The method of claim 31, wherein, in the step of dividing the plural spectral coefficients into bands, the spectral coefficients towards higher frequencies are divided into bands corresponding to a fraction of a critical band.

41. The method of claim 31, wherein:

the method additionally comprises a step of dividing the digital input signal into plural signals, each of the plural signals being in a respective one of plural frequency ranges, the plural signals including a frequency range signal in one of the plural frequency ranges;

in the step of generating an index in response to the digital input signal, an index is generated in response to the frequency range signal;

in the step of determining a division of the digital input signal into blocks, the division of the frequency range signal into blocks is determined in response to the index;

in the step of applying block floating processing to the digital input signal, block floating processing is applied to the blocks of the frequency range signal in response to the index to provide block floating processed blocks of the frequency range signal; and in the step of orthogonally transforming each of the block floating processed blocks of the digital input signal, each of the block floating processed blocks of the frequency range signal is orthogonally transformed to produce ones of the plural spectral coefficients.

42. A method for compressing a digital input signal, the method comprising steps of:

determining a division of the digital input signal into blocks in response to an index;

applying block floating processing to each of the blocks of the digital input signal using the index as a block floating coefficient;

deriving spectral coefficients from the block floating processed blocks of the digital input signal;

dividing the spectral coefficients by frequency into bands; and adaptively allocating a number of quantizing bits for quantizing the spectral coefficients in each of the bands in response to an allowable noise level for each of the bands, the step of adaptively allocating a number of quantizing bits including steps of:

calculating an allowable noise level for each of the bands, comparing, in each of the bands, the allowable noise level with a minimum audible level, and selecting the minimum audible level as the allowable noise level in each of the bands for which the step of comparing determines that the minimum audible level is higher than the allowable noise level.

43. The method of claim 42, wherein the step of deriving spectral coefficients from the digital input signal includes a step of orthogonally transforming the digital input signal.

44. The method of claim 43, wherein, in the step of orthogonally transforming the digital input signal, the digital input signal is orthogonally transformed using a discrete cosine transform.

45. The method of claims 42 or 43, wherein the method is for compressing the digital input signal to provide a compressed signal including a target number of bits, and wherein:

in the step of adaptively allocating a number of quantizing bits, the number of bits adaptively allocated is an actual number of bits;

the method additionally includes a step of determining an error between the actual number of bits and the target number of bits; and the step of adaptively allocating a number of quantizing bits includes a step of adjusting the allowable noise level in ones of the bands in response to the error between the actual number of bits and the target number of bits.

46. The method of claim 45, wherein, in the step of adaptively allocating a number of quantizing bits, the number of quantizing bits allocated to the ones of the bands and the sub bands is adjusted in response to changes in the allowable noise level caused by the step of adjusting the allowable noise level.

47. The method of claims 42 or 43, wherein:

in the step dividing the spectral coefficients into bands, the spectral coefficients are divided into bands including a band corresponding to a critical band, and the spectral coefficients in the band corresponding to a critical band are divided into sub bands, the sub bands including a lowest-frequency sub band;

in the step of comparing, the allowable noise level for the band corresponding to a critical band is compared with the minimum audible level for the lowest-frequency sub band; and in the step of selecting, the minimum audible level for the lowest-frequency sub band is selected as the allowable noise level for the band corresponding to a critical band when the step of comparing indicates that the minimum audible level for the lowest-frequency sub band is higher than the allowable noise level.

48. The method of claim 42, wherein:

the method additionally comprises a step of dividing the digital input signal into plural signals, each of the plural signals being in a respective one of plural frequency ranges, the plural signals including a frequency range signal in one of the plural frequency ranges;

the step of determining a division of the digital input signal into blocks includes a step of generating the index in response to the frequency range signal;

in the step of determining a division of the digital input signal into blocks, a division of the frequency range signal into blocks is determined in response to the index;

in the step of applying block floating processing to each of the blocks of the digital input signal, block floating is applied to the blocks of the frequency range signal in response to the index to generate a block of a block floating processed frequency range signal from each of the blocks of the frequency range signal; and the step of deriving spectral coefficients from the block floating processed blocks of the digital input signal includes a step of orthogonally transforming the block floating processed block of the frequency range signal to produce ones of the spectral coefficients.

49. An apparatus for expanding a compressed digital signal including plural quantized spectral coefficients and auxiliary information, the apparatus comprising:

adaptive bit allocation decoding means, operating in response to the auxiliary information, for inversely quantizing the quantized spectral coefficients to provide plural spectral coefficients;

block floating means for applying inverse block floating to the spectral coefficients to provide inverse block floating processed spectral coefficients;

inverse orthogonal transform means for inversely orthogonally transforming the inverse block floating processed spectral coefficients to provide plural frequency range signals; and inverse filter means for synthesizing the frequency range signals to provide an output signal.

50. The apparatus of claim 49, wherein the inverse orthogonal transform means includes an inverse discrete cosine transform circuit.

51. The apparatus of claim 49, wherein:
  (a) the apparatus is for expanding a compressed digital signal wherein:
    (1) the spectral coefficients are quantized in critical bands,
    (2) the critical bands include a divided band, the divided band being a higher-frequency one of the critical bands that is divided into plural sub bands, the sub bands including a lowest-frequency sub band, and
    (3) the auxiliary information includes an allowable noise level for each of the critical bands, the allowable noise level for the divided band being the allowable noise level for the lowest-frequency sub band; and
  (b) the apparatus additionally comprises means for determining an allowable noise level for each sub band of the divided band in response to the allowable noise level for the divided band.

52. A method for expanding a compressed digital signal to provide a digital output signal, the compressed digital signal including:
  (a) plural quantized spectral coefficients divided by frequency into bands, the bands including a divided band in which the spectral coefficients therein are further divided by frequency into sub bands, the quantized spectral coefficients in each of the bands and each of the sub bands being quantized using an adaptively-allocated number of quantizing bits,
  (b) an allowable noise level for each band, and
  (c) a flag signal for the divided band,
the method comprising the steps of:

setting the allowable noise level of the divided band as the allowable noise level for the divided band when the flag signal for the divided band is in a first state, and setting the allowable noise level of the divided band as the allowable noise level for one of the sub bands constituting the divided band when the flag signal for the divided band is in a second state;

determining, when the flag signal for the divided band is second state, from the allowable noise level of the divided band, an allowable noise level for each of the other ones of the sub bands constituting the divided band;

using the allowable noise level for each of the bands and for each of the sub bands constituting the divided band to inversely quantize the respective quantized spectral coefficients in each of the bands and in each of the sub bands constituting the divided band to provide spectral coefficients; and deriving the digital output signal from the spectral coefficients.

53. The method of claim 52, wherein:
when the flag signal for the divided band is in the second state, the allowable noise level for the divided band is the allowable noise level for the lowest-frequency one of the sub bands constituting the divided band; and in the step of determining an allowable noise level for each of other ones of the sub bands constituting the divided band, the allowable noise level for each of the other ones of the sub bands higher in frequency than the lowest-frequency one of the sub band is calculated.

54. The method of claim 52, wherein:
the method additionally includes a step of providing a read-only memory wherein allowable noise levels are stored; and the step of determining an allowable noise level for each of other ones of the sub bands constituting the divided band includes a step of reading an allowable noise level for each of the other ones of the sub bands from the read-only memory in response to the allowable noise level for the divided band.

55. The method of claim 52, wherein the step of deriving the digital output signal from the spectral coefficients includes steps of:

dividing the spectral coefficients by frequency into plural frequency ranges;

inversely orthogonally transforming the spectral coefficients in each of the frequency ranges to provide frequency range signals; and synthesizing the frequency range signals to provide the digital output signal.

56. The method of claim 52, wherein, in the compressed digital signal, the plural quantized spectral coefficients are divided by frequency into bands corresponding to critical bands.

57. An apparatus for compressing a digital input signal, the apparatus comprising:

means for deriving spectral coefficients from the digital input signal;

frequency dividing means for dividing the spectral coefficients by frequency into bands, the bands including a band corresponding to a critical band, and additionally for subdividing the spectral coefficients in the band by frequency into sub bands, the sub bands including a lowest-frequency sub band;

allowable noise level calculation means for calculating a allowable noise level for each of the bands;

supplying means for supplying a minimum audible level for each of the bands except the band, and for each of the sub bands in the band;

comparing means for determining, in each of the bands except the band, when the minimum audible level supplied by the supplying means is greater than the allowable noise level calculated by the allowable noise level calculation means, and for determining, in the band, when the minimum audible level supplied by the supplying means for only the lowest-frequency sub band is greater than the allowable noise level calculated by the allowable noise level calculation means for the band;

substituting means for substituting, in each one of the bands in which the comparing means determines that the minimum audible level is greater than the allowable noise level, the minimum audible level supplied by the supplying means for the allowable noise level calculated by the allowable noise level calculating means as the allowable noise level for the one of the bands, and for substituting, in each one of the sub bands in the band when the comparing means determines that the minimum audible level for the lowest-frequency sub band is greater than the allowable noise level for the band, the minimum audible level supplied for the one of the sub bands by the supplying means for the allowable noise level calculated for the band by the allowable noise level calculation means as the allowable noise level for the one of the sub bands; and adaptive bit allocation means for adaptively allocating a number of quantizing bits among the bands and the sub bands for quantizing the spectral coefficients therein, the bit allocation means allocating quantizing bits among the bands and the sub bands in response to the allowable noise level for each of the bands and sub bands.

58. The apparatus of claim 57, wherein the means for deriving spectral coefficients from the digital input signal includes an orthogonal transform circuit.

59. The apparatus of claim 58, wherein the orthogonal transform circuit is a Discrete Cosine Transform (DCT) circuit.

60. The apparatus of claim 57, wherein:

the number of quantizing bits adaptively allocated by the adaptive bit allocation means is an actual number of bits;

the apparatus additionally includes:
  means for providing an output signal including a target number of bits, and
  means for determining an error between the actual number of bits and the target number of bits; and the allowable noise level calculation means includes means for adjusting the allowable noise level in ones of the bands and the sub bands in response to the error between the actual number of bits and the target number of bits.

61. The apparatus of claim 60, wherein the adaptive bit allocation means adjusts the number of quantizing bits adaptively allocated to the bands in response to changes in the allowable noise level in the ones of the bands and the sub bands caused by the means for adjusting the allowable noise level.

62. The apparatus of claim 57, wherein the means for deriving spectral coefficients from the digital input signal includes:

block length decision means for determining a division of the digital input signal into blocks in response to an index;

block floating means for applying block floating processing to each block of the digital input signal using the index as a block floating coefficient; and means for deriving the spectral coefficients from the block floating processed blocks of the digital input signal.

63. A method for compressing a digital input signal, the method comprising steps of:

deriving spectral coefficients from the digital input signal;

dividing the spectral coefficients by frequency into bands, the bands including a band corresponding to a critical band;

subdividing the spectral coefficients in the band by frequency into sub bands, the sub bands including a lowest-frequency sub band;

calculating an allowable noise level for each of the bands;

supplying a minimum audible level for each of the bands except the band, and for each of the sub bands in the band;

determining, in each of the bands except the band, when the minimum audible level supplied in the supplying step is greater than the allowable noise level calculated in the allowable noise level calculating step, and determining, in the band, when the minimum audible level supplied in the supplying step for only the lowest-frequency sub band is greater than the allowable noise level calculated for the band in the allowable noise level calculating step;

substituting, in each one of the bands in which determining step determines that the minimum audible level is greater than the allowable noise level, the minimum audible level supplied in the supplying step for the allowable noise level calculated in the allowable noise level calculating step as the allowable noise level for the one of the bands, and substituting, in each one of the sub bands in the band when the determining step determines that the minimum audible level for the lowest-frequency sub band is greater than the allowable noise level for the band, the minimum audible level supplied for the one of the sub bands in the supplying step for the allowable noise level calculated for the band in the allowable noise level calculating step as the allowable noise level for the one of the sub bands; and adaptively allocating a number of quantizing bits among the bands and the sub bands for quantizing the spectral coefficients therein, the quantizing bits being adaptively allocated to each of the bands and the sub bands in response to the allowable noise level for each of the bands and sub bands.

64. The method of claim 63, wherein the step of deriving spectral coefficients from the digital input signal includes a step of orthogonally transforming the digital input signal.

65. The method of claim 64, wherein, in the step of orthogonally transforming the digital input signal, the digital input signal is orthogonally transformed using a discrete cosine transform.

66. The method of claim 63, wherein the method is for compressing the digital input signal to provide a compressed signal including a target number of bits, and wherein:

in the step of adaptively allocating a number of quantizing bits, the number of bits adaptively allocated is an actual number of bits;

the method additionally includes a step of determining an error between the actual number of bits and the target number of bits; and the step of adaptively allocating a number of quantizing bits includes a step of adjusting the allowable noise level in ones of the bands and the sub bands in response to the error between the actual number of bits and the target number of bits.

67. The method of claim 66, wherein, in the step of adaptively allocating a number of quantizing bits, the number of quantizing bits allocated to each of the bands and sub bands is adjusted in response to changes in the allowable noise level in the ones of the bands and the sub bands caused by the step of adjusting the allowable noise level.

68. The method of claim 63, wherein the step of deriving spectral coefficients from the digital input signal includes steps of:

determining a division of the digital input signal into blocks in response to an index;

applying block floating processing to each block of the digital input signal using the index as a block floating coefficient; and deriving the spectral coefficients from the block floating processed blocks of the digital input signal.

* * * * *

US005490170C1

(12) EX PARTE REEXAMINATION CERTIFICATE (10178th)
United States Patent
Akagiri et al.

(10) Number: US 5,490,170 C1
(45) Certificate Issued: May 30, 2014

(54) CODING APPARATUS FOR DIGITAL SIGNAL

(75) Inventors: Kenzo Akagiri, Kanagawa (JP); Kyoya Tsutsui, Kanagawa (JP)

(73) Assignee: Mobilemedia Ideas LLC, Chevy Chase, MD (US)

Reexamination Request:
No. 90/012,564, Sep. 14, 2012

Reexamination Certificate for:
Patent No.: 5,490,170
Issued: Feb. 6, 1996
Appl. No.: 08/159,122
Filed: Nov. 30, 1993

Related U.S. Application Data

(63) Continuation of application No. 07/857,980, filed on Mar. 26, 1992, now abandoned.

(30) Foreign Application Priority Data

Mar. 29, 1991 (JP) ........................................ 3-091548
Mar. 30, 1991 (JP) ........................................ 3-092741

(51) Int. Cl.
*H04B 1/66* (2006.01)

(52) U.S. Cl.
USPC .................... 375/240; 704/501; 704/E19.018

(58) Field of Classification Search
None
See application file for complete search history.

(56) References Cited

To view the complete listing of prior art documents cited during the proceeding for Reexamination Control Number 90/012,564, please refer to the USPTO's public Patent Application Information Retrieval (PAIR) system under the Display References tab.

*Primary Examiner* — Joseph R. Pokrzywa

(57) ABSTRACT

In a coding apparatus for a digital signal adapted for implementing, every variable length block, floating processing to an input digital signal by using a block floating processing circuit thereafter to orthogonally transform signal components which have undergone such processing by using orthogonal transform circuits (e.g., DCT circuits), the block floating processing circuit is constructed so as to determine the length of a variable length block and a floating coefficient of the block floating processing on the basis of the same index, e.g., a maximum absolute value in that block. Thus, a quantity subject to processing can be reduced. In addition, there may be employed such a configuration to divide, every critical bands, spectrum signals on the frequency base from DCT (Discrete Cosine Transform) circuits to determine, every respective critical bands, allowed noises in which the masking is taken into consideration to compare these allowed noises and a minimum audible curve from a minimum audible curve generator at a comparator. When the minimum audible curve is grater than an allowed noise at that time, this minimum audible curve is considered as an allowed noise to divide the critical band into smaller bands to carry out bit allocation every respective smaller bands, and to rase or set a flag. Thus, an accurate allowed noise level can be provided without increasing auxiliary information.

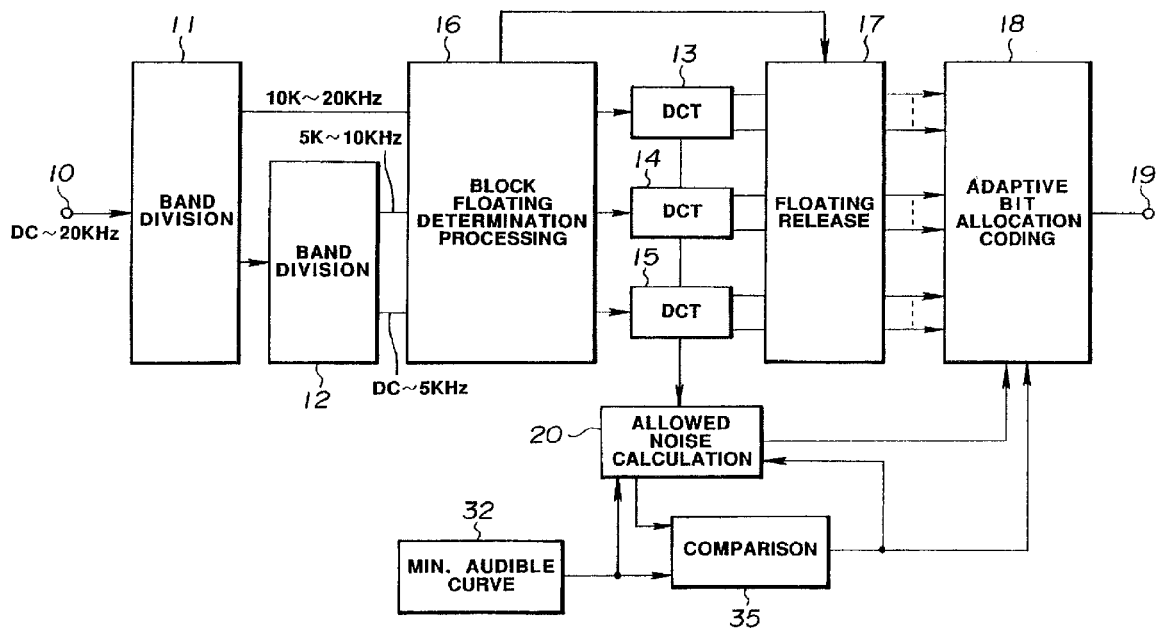

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 49 is cancelled.

Claims 1-48 and 50-68 were not reexamined.

* * * * *